(12) United States Patent
Kirby

(10) Patent No.: US 9,177,606 B2
(45) Date of Patent: Nov. 3, 2015

(54) MULTI-PROGRAM PLAYBACK STATUS DISPLAY

(71) Applicant: EchoStar Technologies L.L.C., Englewood, CO (US)

(72) Inventor: Morgan Kirby, Palmer Lake, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 14/467,959

(22) Filed: Aug. 25, 2014

(65) Prior Publication Data

US 2014/0363139 A1 Dec. 11, 2014

Related U.S. Application Data

(63) Continuation of application No. 13/795,914, filed on Mar. 12, 2013.

(60) Provisional application No. 61/611,483, filed on Mar. 15, 2012.

(51) Int. Cl.
*H04N 9/80* (2006.01)
*G11B 27/28* (2006.01)
*H04N 5/91* (2006.01)
(Continued)

(52) U.S. Cl.
CPC .............. *G11B 27/28* (2013.01); *H04N 5/4401* (2013.01); *H04N 5/50* (2013.01); *H04N 5/76* (2013.01); *H04N 5/782* (2013.01); *H04N 5/91* (2013.01); *H04N 9/79* (2013.01); *H04N 9/797* (2013.01); *H04N 9/87* (2013.01); *H04N 21/4147* (2013.01); *H04N 21/4263* (2013.01); *H04N 21/4302* (2013.01); *H04N 21/4334* (2013.01); *H04N 21/4583* (2013.01); *H04N 21/47214* (2013.01); *H04N 21/47217* (2013.01);
(Continued)

(58) Field of Classification Search
CPC ..... H04N 5/76; H04N 9/797; H04N 21/4583; H04N 21/47217; H04N 21/4826
See application file for complete search history.

(56) References Cited

U.S. PATENT DOCUMENTS 4,706,121 A 11/1987 Young
4,723,246 A 2/1988 Weldon, Jr.
(Continued)

FOREIGN PATENT DOCUMENTS

CN 101 404 780 A 4/2009
EP 0 903 743 A 3/1999
(Continued)

OTHER PUBLICATIONS

Author Unknown, "Move Networks is Delivering the Next Generation of Television," Move Networks, 2010, obtained online at http://movenetworks.com/, 2 pages.
(Continued)

*Primary Examiner* — Huy T Nguyen
(74) *Attorney, Agent, or Firm* — Kilpatrick Townsend & Stockton LLP

(57) ABSTRACT

Various arrangements are described that may cause a recording of a television channel to be stored. The recording of the television channel may include a plurality of television programs. A graphical playback status element may be displayed via a display device. The graphical playback status element may indicate a start point for each television program of the plurality of television programs within the recording of the television channel.

20 Claims, 11 Drawing Sheets

(51) Int. Cl.
   *H04N 5/50*         (2006.01)
   *H04N 9/87*         (2006.01)
   *H04N 9/79*         (2006.01)
   *H04N 21/472*       (2011.01)
   *H04N 9/797*        (2006.01)
   *H04N 5/782*        (2006.01)
   *H04N 21/426*       (2011.01)
   *H04N 21/433*       (2011.01)
   *H04N 5/44*         (2011.01)
   *H04N 5/76*         (2006.01)
   *H04N 21/4147*      (2011.01)
   *H04N 21/43*        (2011.01)
   *H04N 21/458*       (2011.01)
   *H04N 21/482*       (2011.01)
   *H04N 7/20*         (2006.01)

(52) U.S. Cl.
   CPC ............... *H04N 21/482* (2013.01); *H04N 7/20* (2013.01); *H04N 21/4826* (2013.01)

(56) References Cited

U.S. PATENT DOCUMENTS

| | | | |
|---|---|---|---|
| 4,802,215 | A | 1/1989 | Mason |
| 5,187,589 | A | 2/1993 | Kono et al. |
| 5,335,277 | A | 8/1994 | Harvey et al. |
| 5,483,277 | A | 1/1996 | Granger |
| 5,488,658 | A | 1/1996 | Hirashima |
| 5,541,738 | A | 7/1996 | Mankovitz |
| 5,642,153 | A | 6/1997 | Chaney et al. |
| 5,684,969 | A | 11/1997 | Ishida |
| 5,805,763 | A | 9/1998 | Lawler et al. |
| 5,974,218 | A | 10/1999 | Nagasaka et al. |
| 6,628,891 | B1 | 9/2003 | Vantalon et al. |
| 6,701,528 | B1 | 3/2004 | Arsenault et al. |
| 6,766,523 | B2 | 7/2004 | Herley |
| 6,798,971 | B2 | 9/2004 | Potrebic |
| 6,938,208 | B2 | 8/2005 | Reichardt |
| 7,024,676 | B1 | 4/2006 | Klopfenstein |
| 7,409,140 | B2 | 8/2008 | Rodriguez et al. |
| 7,487,529 | B1 | 2/2009 | Orlick |
| 7,490,169 | B1 | 2/2009 | Ogdon et al. |
| 7,493,312 | B2 | 2/2009 | Liu et al. |
| 7,542,656 | B2 | 6/2009 | Cho et al. |
| 7,577,751 | B2 | 8/2009 | Vinson et al. |
| 7,590,993 | B1 | 9/2009 | Hendricks et al. |
| 7,715,552 | B2 | 5/2010 | Pinder et al. |
| 7,730,517 | B1 | 6/2010 | Rey et al. |
| 7,739,711 | B2 | 6/2010 | Finseth et al. |
| 7,760,986 | B2 | 7/2010 | Beuque |
| 7,804,861 | B2 | 9/2010 | Kim |
| 7,848,618 | B2 | 12/2010 | Potrebic et al. |
| 7,856,557 | B2 | 12/2010 | Beuque |
| 7,926,078 | B2 | 4/2011 | Arsenault et al. |
| 7,929,697 | B2 | 4/2011 | McNeely et al. |
| 7,962,937 | B2 | 6/2011 | Cho et al. |
| 8,006,268 | B2 | 8/2011 | Sloo |
| 8,201,194 | B2 | 6/2012 | Wijnands et al. |
| 8,321,466 | B2 | 11/2012 | Black et al. |
| 8,364,671 | B1 | 1/2013 | Sinton et al. |
| 8,437,622 | B2 | 5/2013 | Casagrande |
| 8,447,170 | B2 | 5/2013 | Casagrande |
| 8,566,873 | B2 | 10/2013 | Sie et al. |
| 8,584,167 | B2 | 11/2013 | Vanduyn |
| 8,606,088 | B2 | 12/2013 | Kummer et al. |
| 8,627,349 | B2 | 1/2014 | Kirby et al. |
| 8,660,412 | B2 | 2/2014 | Kummer et al. |
| 8,763,027 | B2 | 6/2014 | Martch |
| 8,774,608 | B2 | 7/2014 | Kummer et al. |
| 8,819,722 | B2 | 8/2014 | Kummer et al. |
| 8,819,761 | B2 | 8/2014 | Minnick |
| 8,850,476 | B2 | 9/2014 | VanDuyn et al. |
| 8,867,893 | B2 | 10/2014 | Kirby |
| 8,959,544 | B2 | 2/2015 | Kummer et al. |
| 8,959,566 | B2 | 2/2015 | Kummer |
| 8,989,562 | B2 | 3/2015 | Kummer et al. |
| 8,997,153 | B2 | 3/2015 | Templeman |
| 9,031,385 | B2 | 5/2015 | Casagrande et al. |
| 9,043,843 | B2 | 5/2015 | Templeman et al. |
| 9,055,274 | B2 | 6/2015 | Casagrande |
| 9,088,763 | B2 | 7/2015 | Martch et al. |
| 9,113,222 | B2 | 8/2015 | VanDuyn |
| 2001/0028782 | A1 | 10/2001 | Ohno et al. |
| 2001/0033736 | A1 | 10/2001 | Yap et al. |
| 2001/0034787 | A1 | 10/2001 | Takao et al. |
| 2002/0044658 | A1 | 4/2002 | Wasilewski et al. |
| 2002/0054752 | A1 | 5/2002 | Wood et al. |
| 2002/0055343 | A1 | 5/2002 | Stetzler et al. |
| 2002/0087979 | A1 | 7/2002 | Dudkiewicz et al. |
| 2002/0087983 | A1 | 7/2002 | Son et al. |
| 2002/0092021 | A1 | 7/2002 | Yap et al. |
| 2002/0095510 | A1 | 7/2002 | Sie et al. |
| 2002/0097340 | A1 | 7/2002 | Takagi et al. |
| 2002/0141431 | A1 | 10/2002 | Tripathy |
| 2002/0144266 | A1 | 10/2002 | Goldman et al. |
| 2002/0152299 | A1 | 10/2002 | Traversat et al. |
| 2002/0164147 | A1 | 11/2002 | Suda |
| 2002/0168178 | A1 | 11/2002 | Rodriguez et al. |
| 2002/0174430 | A1 | 11/2002 | Ellis et al. |
| 2002/0188943 | A1 | 12/2002 | Freeman et al. |
| 2003/0026423 | A1 | 2/2003 | Unger et al. |
| 2003/0078930 | A1 | 4/2003 | Surcouf et al. |
| 2003/0110514 | A1 | 6/2003 | West et al. |
| 2003/0152360 | A1 | 8/2003 | Mukai et al. |
| 2003/0156826 | A1 | 8/2003 | Sonoda et al. |
| 2003/0177495 | A1 | 9/2003 | Needham et al. |
| 2003/0200548 | A1 | 10/2003 | Baran et al. |
| 2003/0208763 | A1 | 11/2003 | McElhatten et al. |
| 2004/0001087 | A1 | 1/2004 | Warmus et al. |
| 2004/0015992 | A1 | 1/2004 | Hasegawa et al. |
| 2004/0015999 | A1 | 1/2004 | Carlucci et al. |
| 2004/0103428 | A1 | 5/2004 | Seok et al. |
| 2004/0128682 | A1 | 7/2004 | Liga et al. |
| 2004/0162871 | A1 | 8/2004 | Pabla et al. |
| 2004/0218905 | A1 | 11/2004 | Green et al. |
| 2004/0242150 | A1 | 12/2004 | Wright et al. |
| 2004/0268387 | A1 | 12/2004 | Wendling |
| 2005/0083865 | A1 | 4/2005 | Ashley et al. |
| 2005/0120049 | A1 | 6/2005 | Kanegae et al. |
| 2005/0125683 | A1 | 6/2005 | Matsuyama et al. |
| 2005/0147383 | A1 | 7/2005 | Ihara |
| 2005/0180568 | A1 | 8/2005 | Krause |
| 2005/0229213 | A1 | 10/2005 | Ellis et al. |
| 2005/0271365 | A1 | 12/2005 | Hisatomi |
| 2005/0273819 | A1 | 12/2005 | Knudson et al. |
| 2006/0010464 | A1 | 1/2006 | Azami |
| 2006/0020962 | A1 | 1/2006 | Stark et al. |
| 2006/0056800 | A1 | 3/2006 | Shimagami et al. |
| 2006/0075434 | A1 | 4/2006 | Chaney et al. |
| 2006/0080716 | A1 | 4/2006 | Nishikawa et al. |
| 2006/0085828 | A1 | 4/2006 | Dureau et al. |
| 2006/0206819 | A1 | 9/2006 | Tsuji et al. |
| 2006/0212900 | A1 | 9/2006 | Ismail et al. |
| 2006/0215993 | A1 | 9/2006 | Yamada |
| 2006/0274208 | A1 | 12/2006 | Pedlow, Jr. |
| 2007/0016546 | A1 | 1/2007 | De Vorchik et al. |
| 2007/0039032 | A1 | 2/2007 | Goldey et al. |
| 2007/0061378 | A1 | 3/2007 | Lee et al. |
| 2007/0154163 | A1 | 7/2007 | Cordray |
| 2007/0157248 | A1 | 7/2007 | Ellis |
| 2007/0157253 | A1 | 7/2007 | Ellis et al. |
| 2007/0165855 | A1 | 7/2007 | Inui |
| 2007/0183745 | A1 | 8/2007 | White |
| 2007/0192586 | A1 | 8/2007 | McNeely |
| 2007/0204288 | A1 | 8/2007 | Candelore |
| 2007/0234395 | A1 | 10/2007 | Dureau et al. |
| 2007/0250856 | A1 | 10/2007 | Leavens et al. |
| 2007/0258596 | A1 | 11/2007 | Kahn et al. |
| 2008/0046929 | A1 | 2/2008 | Cho et al. |
| 2008/0052743 | A1 | 2/2008 | Moore |
| 2008/0092164 | A1 | 4/2008 | Agarwal et al. |
| 2008/0101760 | A1 | 5/2008 | Waller |
| 2008/0104534 | A1 | 5/2008 | Park et al. |

(56) References Cited

U.S. PATENT DOCUMENTS

| | | |
|---|---|---|
| 2008/0137850 A1 | 6/2008 | Mamidwar |
| 2008/0141322 A1 | 6/2008 | Jang et al. |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1 | 9/2008 | Pfeffer et al. |
| 2008/0222678 A1 | 9/2008 | Burke et al. |
| 2008/0222681 A1 | 9/2008 | Kwon |
| 2008/0271077 A1 | 10/2008 | Kim et al. |
| 2008/0273698 A1 | 11/2008 | Manders et al. |
| 2008/0276284 A1 | 11/2008 | Bumgardner et al. |
| 2008/0288461 A1 | 11/2008 | Glennon et al. |
| 2008/0291206 A1 | 11/2008 | Uchimura et al. |
| 2008/0298585 A1 | 12/2008 | Maillard et al. |
| 2008/0301740 A1 | 12/2008 | Tsutsui |
| 2008/0307217 A1 | 12/2008 | Yukimatsu et al. |
| 2009/0051579 A1 | 2/2009 | Inaba et al. |
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0110367 A1 | 4/2009 | Fukui |
| 2009/0129741 A1 | 5/2009 | Kim |
| 2009/0129749 A1 | 5/2009 | Oyamatsu et al. |
| 2009/0165057 A1 | 6/2009 | Miller et al. |
| 2009/0172722 A1 | 7/2009 | Kahn et al. |
| 2009/0178098 A1 | 7/2009 | Westbrook et al. |
| 2009/0210912 A1 | 8/2009 | Cholas et al. |
| 2009/0235298 A1 | 9/2009 | Carlberg et al. |
| 2009/0254962 A1 | 10/2009 | Hendricks et al. |
| 2009/0260038 A1 | 10/2009 | Acton et al. |
| 2009/0320073 A1 | 12/2009 | Reisman |
| 2010/0020794 A1 | 1/2010 | Cholas et al. |
| 2010/0037282 A1 | 2/2010 | Iwata et al. |
| 2010/0050225 A1 | 2/2010 | Bennett |
| 2010/0086277 A1 | 4/2010 | Craner |
| 2010/0100899 A1 | 4/2010 | Bradbury et al. |
| 2010/0115121 A1 | 5/2010 | Roos et al. |
| 2010/0135639 A1 | 6/2010 | Ellis et al. |
| 2010/0146581 A1 | 6/2010 | Erk |
| 2010/0158479 A1 | 6/2010 | Craner |
| 2010/0158480 A1 | 6/2010 | Jung et al. |
| 2010/0169926 A1 | 7/2010 | Westberg et al. |
| 2010/0195827 A1 | 8/2010 | Lee et al. |
| 2010/0232604 A1 | 9/2010 | Eklund, II |
| 2010/0235862 A1 | 9/2010 | Adachi |
| 2010/0239228 A1 | 9/2010 | Sano |
| 2010/0247067 A1 | 9/2010 | Gratton |
| 2010/0265391 A1 | 10/2010 | Muramatsu et al. |
| 2010/0284537 A1 | 11/2010 | Inbar |
| 2010/0299528 A1 | 11/2010 | Le Floch |
| 2010/0313222 A1 | 12/2010 | Lee et al. |
| 2011/0001879 A1 | 1/2011 | Goldey et al. |
| 2011/0007218 A1 | 1/2011 | Moran et al. |
| 2011/0043652 A1 | 2/2011 | King et al. |
| 2011/0078750 A1 | 3/2011 | Tam et al. |
| 2011/0099364 A1 | 4/2011 | Robyr et al. |
| 2011/0131413 A1 | 6/2011 | Moon et al. |
| 2011/0138169 A1 | 6/2011 | Michel |
| 2011/0145854 A1 | 6/2011 | Bacon et al. |
| 2011/0162011 A1 | 6/2011 | Hassell et al. |
| 2011/0179453 A1 | 7/2011 | Poniatowski |
| 2011/0225616 A1 | 9/2011 | Ellis |
| 2011/0239249 A1 | 9/2011 | Murison et al. |
| 2011/0255002 A1 | 10/2011 | Witheiler |
| 2011/0286719 A1 | 11/2011 | Woods |
| 2011/0311045 A1 | 12/2011 | Candelore et al. |
| 2012/0278837 A1 | 11/2012 | Curtis et al. |
| 2012/0296745 A1 | 11/2012 | Harper et al. |
| 2012/0301104 A1 | 11/2012 | Dove |
| 2012/0311534 A1 | 12/2012 | Fox et al. |
| 2012/0311634 A1 | 12/2012 | Van Duyn |
| 2012/0331505 A1 | 12/2012 | Chun et al. |
| 2013/0014146 A1 | 1/2013 | Bhatia et al. |
| 2013/0014159 A1 | 1/2013 | Wiser et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0298166 A1 | 11/2013 | Herrington et al. |
| 2013/0347037 A1 | 12/2013 | Soroushian |
| 2014/0047477 A1 | 2/2014 | VanDuyn |
| 2014/0050462 A1 | 2/2014 | Kummer et al. |
| 2014/0126889 A1 | 5/2014 | Kummer et al. |
| 2014/0130094 A1 | 5/2014 | Kirby et al. |
| 2014/0341377 A1 | 11/2014 | Kummer et al. |
| 2014/0344858 A1 | 11/2014 | Minnick |
| 2015/0095948 A1 | 4/2015 | Kummer et al. |
| 2015/0121430 A1 | 4/2015 | Templeman |
| 2015/0208119 A1 | 7/2015 | Casagrande et al. |
| 2015/0228305 A1 | 8/2015 | Templeman et al. |

FOREIGN PATENT DOCUMENTS

| | | |
|---|---|---|
| EP | 0 973 333 A | 1/2000 |
| EP | 1 168 347 A | 1/2002 |
| EP | 1372339 A2 | 12/2003 |
| EP | 1 667 452 B1 | 6/2006 |
| EP | 1 742 467 A2 | 1/2007 |
| EP | 2 018 059 A1 | 1/2009 |
| EP | 2 317 767 A1 | 5/2011 |
| EP | 2 357 563 A1 | 8/2011 |
| EP | 2 403 239 A1 | 1/2012 |
| EP | 2 826 197 A1 | 1/2015 |
| EP | 2 826 238 A1 | 1/2015 |
| IN | 9740/CHENP/2013 A | 9/2014 |
| JP | 2007 116525 A | 5/2007 |
| WO | 98/12872 A1 | 3/1998 |
| WO | 02/41625 A1 | 5/2002 |
| WO | 2004/057610 A1 | 7/2004 |
| WO | 2007/047410 A2 | 4/2007 |
| WO | 2008/010689 A1 | 1/2008 |
| WO | 2008/060486 A2 | 5/2008 |
| WO | 2011/027236 A1 | 3/2011 |
| WO | 2011/081729 A1 | 7/2011 |
| WO | 2013/028824 A2 | 2/2013 |
| WO | 2013/028829 A2 | 2/2013 |
| WO | 2013/028835 A1 | 2/2013 |
| WO | 2013/138606 A1 | 9/2013 |
| WO | 2013/138608 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |

OTHER PUBLICATIONS

Author Unknown, "EE Launches home TV service in UK," dated Oct. 8, 2014, 3 pages. Retrieved on Oct. 13, 2014 from http://www.bbc.com/news/technology-29535279.

(56) References Cited

OTHER PUBLICATIONS

Author Unknown, "EE TV It's simply great television," Accessed on Oct. 13, 2014, 11 pages. Retrieved from https//ee.co.uk/ee-and-me/ee-tv.
Design and implementation of a multi-stream cableCARD with a high-speed DVB-common descrambler; Joonyoung Jung, Ohyung Kwon, Sooin Lee; In proceeding of: Proceedings of the 14th ACM International Conference on Multimedia, Santa Barbara, CA, USA, Oct. 23-27, 2006, 4 pages.
Jensen, Craig, "Fragmentation: the condition, the cause, the cure" 'Online!, Executive Software International, 1994; ISBN: 0964004909; retrieved from Internet: <URL: www.executive.com/fragbook/fragbook.htm> * Chapter: "How a disk works", Section: "The original problem". Retrieved on Jan. 9, 2014, 70 pages.
International Search Report and Written Opinion of PCT/US2012/51992 mailed Nov. 2, 2012, 15 pages.
International Search Report and Written Opinion of PCT/US2012/51987 mailed Oct. 23, 2012, 20 pages.
International Search Report and Written Opinion of PCT/US2012/051984 mailed Nov. 5, 2012, 13 pages.
International Search Report and Written Opinion of PCT/US2012/52002 mailed Oct. 16, 2012, 17 pages.
International Search Report and Written Opinion of PCT/US2013/031432 mailed May 28, 2013, 10 pages.
International Preliminary Report on Patentability for PCT/US2013/031432 issued Sep. 16, 2014, 9 pages.
International Search Report and Written Opinion of PCT/US2013/031445 mailed May 24, 2013, 11 pages.
International Preliminary Report on Patentability for PCT/US2013/031445 issued Sep. 16, 2014, 10 pages.
International Preliminary Report on Patentability for PCT/US2012/052002 mailed on Apr. 17, 2014, 10 pages.
International Search Report and Written Opinion of PCT/US2012/51964 mailed Nov. 2, 2012, 13 pages.
International Search Report and Written Opinion of PCT/US2012/052011 mailed Dec. 17, 2012, 44 pages.
International Preliminary Report on Patentability, PCT/US2012/052011, mailed on Mar. 6, 2014, 6 pages.
International Preliminary Report on Patentability, PCT/US2012/051984, mailed on Mar. 6, 2014, 8 pages.
International Preliminary Report on Patentability, PCT/US2012/051964, mailed on Apr. 10, 2014, 7 pages.
International Preliminary Report on Patentability, PCT/US2012/051992, mailed on Apr. 3, 2014, 7 pages.
International Preliminary Report on Patentability, PCT/US2012/051987, mailed on Mar. 6, 2014, 7 pages.
International Preliminary Report on Patentability for PCT/US2013/032176 mailed Sep. 25, 2014, 7 pages.
International Search Report and Written Opinion of PCT/US2013/32176 mailed on Jun. 25, 2013, 15 pages.
International Search Report and Written Opinion of PCT/US2013/031565 mailed on May 31, 2013, 82 pages.
International Preliminary Report on Patentability for PCT/US2013/031565 issued Sep. 16, 2014, 18 pages.
International Preliminary Report on Patentability for PCT/US2013/031915 issued Sep. 16, 2014, 5 pages.
International Search Report and Written Opinion of PCT/US2013/031915 mailed on Jun. 3, 2013, 7 pages.
International Search Report of PCT/KR2007/003521 mailed on Oct. 23, 2007, 22 pages.
International Search Report of PCT/IB2003/005737 mailed on Mar. 2, 2004, 21 pages.
International Search Report and Written Opinion of PCT/US2013/031440 mailed May 30, 2013, 14 pages.
International Preliminary Report on Patentability for PCT/US2013/031440 mailed Sep. 25, 2014, 8 pages.
McCann, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-box-takes-aim-at-sky-virgin-media-and-youview-1268223.
U.S. Appl. No. 13/757,168, filed Feb. 1, 2013, Non Final Office Action mailed Jun. 4, 2014, 23 pages.
U.S. Appl. No. 13/799,604, filed Mar. 13, 2013, Non Final Office Action mailed Jun. 6, 2014, 24 pages.
U.S. Appl. No. 13/149,852, filed May 31, 2011, Non-Final Office Action mailed Dec. 12, 2012, 9 pages.
U.S. Appl. No. 13/149,852, filed May 31, 2011, Final Office Action mailed Mar. 26, 2013, 13 pages.
U.S. Appl. No. 13/149,852, filed May 31, 2011, Notice of Allowance mailed Jul. 11, 2013, 13 pages.
U.S. Appl. No. 13/286,157, filed Oct. 31, 2011, Non-Final Office Action mailed Jan. 17, 2013, 20 pages.
U.S. Appl. No. 13/286,157, filed Oct 31, 2011, Non-Final Office Action mailed Jul. 25, 2013, 49 pages.
U.S. Appl. No. 13/286,157, filed Oct 31, 2011, Notice of Allowance mailed Feb. 3, 2014, 81 pages.
U.S. Appl. No. 13/215,702, filed Aug. 23, 2011, Notice of Allowance mailed Feb. 11, 2013, 13 pages.
U.S. Appl. No. 13/288,002, filed Nov. 2, 2011, Non-final Office Action mailed Sep. 26, 2013, 15 pages.
U.S. Appl. No. 13/288,002, filed Nov. 2, 2011, Final Office Action mailed Mar. 27, 2014, 20 pages.
U.S. Appl. No. 13/302,852, filed Nov. 22, 2011 Non-Final Rejection mailed May 23, 2013, 19 pages.
U.S. Appl. No. 13/302,852, filed Nov. 22, 2011, Final Rejection mailed Dec. 9, 2013, 23 pages.
U.S. Appl. No. 13/302,852, filed Nov. 22, 2011, Non-Final Rejection mailed Sep. 2, 2014, 28 pages.
U.S. Appl. No. 13/324,831, filed Dec. 13, 2011, Non-Final Office Action mailed Feb. 28, 2013, 23 pages.
U.S. Appl. No. 13/324,831, filed Dec. 13, 2011, Notice of Allowance mailed Sep. 4, 2013, 22 pages.
U.S. Appl. No. 13/292,047, filed Nov. 8, 2011, Non-Final Office Action mailed Jan. 18, 2013, 17 pages.
U.S. Appl. No. 13/292,047, filed Nov. 8, 2011, Final Office Action mailed Aug. 19, 2013, 17 pages.
U.S. Appl. No. 13/614,899, filed Sep. 13, 2012, Non-Final Office Action mailed Feb. 5, 2013, 17 pages.
U.S. Appl. No. 13/614,899, filed Sep. 13, 2012, Non-Final Office Action mailed May 20, 2014, 25 pages.
U.S. Appl. No. 13/614,899, filed Sep. 13, 2012, Non-Final Office Action mailed Sep. 17, 2013, 17 pages.
U.S. Appl. No. 13/614,899, filed Sep. 13, 2012, Final Office Action mailed Mar. 17, 2014, 41 pages.
U.S. Appl. No. 13/291,014, filed Nov. 7, 2011, Non-Final Office Action mailed Mar. 29, 2013, 21 pages.
U.S. Appl. No. 13/291,014, filed Nov. 7, 2011, Notice of Allowance mailed Aug. 7, 2013, 16 pages.
U.S. Appl. No. 13/215,598, filed Aug. 23, 2011, Non-Final Office Action mailed Jun. 20, 2013, 15 pages.
U.S. Appl. No. 13/215,598, filed Aug 23, 2011, Final Office Action mailed Nov. 21, 2013, 23 pages.
U.S. Appl. No. 13/215,598, filed Aug 23, 2011, Non-Final Office Action mailed Feb. 6, 2014, 12 pages.
U.S. Appl. No. 13/215,598, filed Aug 23, 2011 Final Office Action mailed Jul. 2, 2014, 22 pages.
U.S. Appl. No. 13/215,655, filed Aug. 23, 2011, Non-Final Office Action mailed Sep. 6, 2013, 27 pages.
U.S. Appl. No. 13/215,655, filed Aug 23, 2011, Final Office Action mailed Dec. 18, 2013, 20 pages.
U.S. Appl. No. 13/215,916, filed Aug. 23, 2011, Notice of Allowance mailed Jan. 4, 2013, 10 pages.
U.S. Appl. No. 13/294,005, filed Nov. 11, 2011 Non-Final Office Action mailed May 20, 2014, 33 pages.
U.S. Appl. No. 13/294,005, filed Nov. 11, 2011, Non-Final Office Action mailed Aug. 14, 2013, 32 pages.
U.S. Appl. No. 13/294,005, filed Nov. 11, 2011, Final Office Action mailed Jan. 3, 2014, 29 pages.
U.S. Appl. No. 13/592,976, filed Aug. 23, 2012, Notice of Allowance mailed Oct. 7, 2013, 18 pages.
U.S. Appl. No. 13/797,173, filed Mar. 12, 2013, Non Final Office Action mailed May 15, 2014, 28 pages.

(56) References Cited

OTHER PUBLICATIONS

U.S. Appl. No. 13/799,653, filed Mar. 13, 2013, Non Final Office Action mailed May 8, 2014, 24 pages.
U.S. Appl. No. 13/829,350, filed Mar. 14, 2013, Non Final Office Action mailed Feb. 28, 2014, 29 pages.
U.S. Appl. No. 13/829,350, filed Mar. 14, 2013 Non Final Office Action mailed Jul. 29, 2014, 24 pages.
U.S. Appl. No. 13/828,001, filed Mar. 14, 2013, Notice of Allowance mailed Apr. 25, 2014, 43 pages.
U.S. Appl. No. 13/799,719, filed Mar. 13, 2013, Non Final Office Action mailed Oct. 25, 2013, 79 pages.
U.S. Appl. No. 13/799,719, filed Mar. 13, 2013, Notice of Allowance mailed Apr. 23, 2014, 141 pages.
U.S. Appl. No. 14/064,423, filed Oct. 28, 2013, Non-Final Office Action mailed Dec. 20, 2013, 18 pages.
U.S. Appl. No. 14/064,423, filed Oct. 28, 2013, Notice of Allowance mailed Mar. 4, 2013, 37 pages.
U.S. Appl. No. 13/793,636, filed Mar. 11, 2013, Non-Final Office Action mailed Sep. 29, 2014, 27 pages.
U.S. Appl. No. 13/795,914, filed Mar. 6, 2013 Notice of Allowance mailed Jul. 21, 2014, 13 pages.
U.S. Appl. No. 13/795,914, filed Mar. 6, 2013 Final Office Action mailed Apr. 3, 2014, 17 pages.
U.S. Appl. No. 13/795,914, filed Mar. 6, 2013, Non-Final Office Action mailed Oct. 11, 2013, 17 pages.
U.S. Appl. No. 13/800,477, filed Mar. 13, 2013 Non-Final Office Action mailed Sep. 11, 2014, 34 pages.
Williams, Christopher, "EE to launch TV set-top box," dated Oct. 7, 2014, 2 pages. Retrieved on Oct. 13, 2014 from http://www.telegraph.co.uk/finance/newsbysector/mediatechnologyandtelecoms/telecoms/11147319/EE-to-launch-TV-set-top-box.html.
Extended European Search Report for EP 12825080 mailed Sep. 11, 2014, 10 pages.
Extended European Search Report for EP 12825521 mailed Nov. 24, 2014, 7 pages.
The Office Action dated Nov. 6, 2014 for Mexican Patent Application No. MX/a/2013/014677 is not translated into English. This document is from prosecution of the corresponding foreign matter for which we do not have a translation, 2 pages.
U.S. Appl. No. 14/095,860, filed Dec. 3, 2013 Non-Final Office Action mailed Dec. 26, 2014, 45 pages.
U.S. Appl. No. 14/043,617, filed Oct. 1, 2013 Non-Final Office Action mailed Jan. 5, 2015, 45 pages.
U.S. Appl. No. 13/856,752, filed Apr. 4, 2013 Non Final Office Action mailed Nov. 5, 2014, 34 pages.
U.S. Appl. No. 13/829,350, filed Mar. 14, 2013 Final Office Action mailed Jan. 23, 2015, 18 pages.
U.S. Appl. No. 13/799,653, filed Mar. 13, 2013 Notice of Allowance mailed Nov. 26, 2014, 32 pages.
U.S. Appl. No. 13/797,173, filed Mar. 12, 2013 Notice of Allowance mailed Nov. 24, 2014, 37 pages.
U.S. Appl. No. 13/757,168, filed Feb. 1, 2013 Notice of Allowance mailed Oct. 14, 2014, 28 pages.
U.S. Appl. No. 13/294,005, filed Nov. 11, 2011 Notice of Allowance mailed Oct. 31, 2014, 24 pages.
U.S. Appl. No. 13/292,047, filed Nov. 8, 2011 Final Office Action mailed Jan. 13, 2015, 22 pages.
U.S. Appl. No. 13/215,598, filed Aug 23, 2011 Non-Final Office Action mailed Nov. 25, 2014, 18 pages.
U.S. Appl. No. 13/856,752, filed Apr. 4, 2013 Notice of Allowance mailed Feb. 10, 2015, 20 pages.
U.S. Appl. No. 13/799,604, filed Mar. 13, 2013, Final Office Action mailed Jan. 14, 2015, 36 pages.
U.S. Appl. No. 13/797,173, filed Mar. 12, 2013 Notice of Allowance mailed Feb. 26, 2015, 19 pages.
U.S. Appl. No. 13/793,636, filed Mar. 11, 2013, Notice of Allowance mailed Jan. 28, 2015, 43 pages.
U.S. Appl. No. 13/800,477, filed Mar. 13, 2013 Notice of Allowance mailed Feb. 18, 2015, 18 pages.
Extended European Search Report for EP 12825474 mailed Jan. 7, 2015, 6 pages.
Extended European Search Report for EP 12825430 mailed Feb. 3, 2015, all pages.
The Office Action dated Nov. 7, 2014 for Mexican Patent Application No. MX/a/2013/014907 is not translated into English, 3 pages.
The Office Action dated Jan. 23, 2015 for Mexican Patent Application No. MX/a/2013/014671 is not translated into English, 3 pages.
U.S. Appl. No. 14/060,388, filed Oct. 22, 2013 Notice of Allowance mailed Apr. 13, 2015, 44 pages.
U.S. Appl. No. 13/888,012, filed May 6, 2013 Non-Final Rejection mailed Apr. 6, 2015, 36 pages.
U.S. Appl. No. 13/801,968, filed Mar. 13, 2013 Non Final Office Action mailed May 21, 2015, 49 pages.
U.S. Appl. No. 13/614,899, filed Sep. 13, 2012 Notice of Allowance mailed Mar. 13, 2015, 35 pages.
U.S. Appl. No. 13/302,852, filed Nov. 22, 2011 Final Rejection mailed Mar. 30, 2015, 29 pages.
European Search Report for EP 12825653 dated Mar. 11, 2015, 7 pages.
Supplementary European Search Report for Application No. EP 12825147 dated Mar. 27, 2015, 9 pages.
The Notice of Allowance by the Mexican Institute of Industrial Property for Mexican Patent Application No. MX/a/2013/014907 dated Feb. 20, 2015 is not translated into English, 1 page.
The Notice of Allowance by the Mexican Institute of Industrial Property for Mexican Patent Application No. MX/a/2013/014677 dated Mar. 19, 2015 is not translated into English, 1 page.
The second Office Action dated Feb. 26, 2015 for Mexican Pat. Appln. No. MX/a/2013/014217 is not translated into English, 3 pages.
U.S. Appl. No. 13/215,598, filed Aug 23, 2011 Final Office Action mailed May 5, 2015, 17 pages.
Supplementary European Search Report for EP 13761291.7 mailed Jul. 9, 2015, 8 pages.
Office Action dated May 18, 2015 for Mexican Patent Application No. MX/a/2014/009776, 2 pages.
Office Action dated May 12, 2015 for Mexican Patent Application No. MX/a/2014/009723, 2 pages.
U.S. Appl. No. 14/154,887, filed Jan. 14, 2014 Non-Final Rejection mailed Jul. 17, 2015, 33 pages.
U.S. Appl. No. 14/095,860, filed Dec. 3, 2013 Notice of Allowance mailed Jul. 13, 2015, 31 pages.
U.S. Appl. No. 14/043,617, filed Oct. 1, 2013 Final Office Action mailed Jul. 16, 2015, 45 pages.
U.S. Appl. No. 13/888,012, filed May 6, 2013 Notice of Allowance mailed Jul. 14, 2015, 18 pages.
U.S. Appl. No. 13/829,350, filed Mar. 14, 2013 Notice of Allowance mailed Jul. 24, 2015, 29 pages.
U.S. Appl. No. 13/799,604, filed Mar. 13, 2013 Notice of Allowance mailed May 29, 2015, 46 pages.
U.S. Appl. No. 13/302,852, filed Nov. 22, 2011 Notice of Allowance mailed Jun. 19, 2015, 26 pages.
U.S. Appl. No. 13/292,047, filed Nov. 8, 2011 Non-Final Office Action mailed Jul. 7, 2015, 28 pages.
U.S. Appl. No. 13/288,002, filed Nov. 2, 2011 Non Final Rejection mailed Jul. 28, 2015, 29 pages.
U.S. Appl. No. 13/799,604, filed Mar. 13, 2013, Notice of Allowance mailed Jul. 24, 2015, 34 pages.
U.S. Appl. No. 14/340,190, filed Jul. 24, 2014, Non-Final Rejection mailed Aug. 31, 2015, 74 pages.
Extended European Search Report for EP 13760237.1, received Jul. 21, 2015, 8 pages.
First Office Action and Search Report from the State Intellectual Property Office (SIPO) for CN 201280031434.7, issued Jul. 17, 2015, 12 pages.

MULTI-PROGRAM PLAYBACK STATUS DISPLAY

CROSS-REFERENCES TO RELATED APPLICATIONS

This application is a continuation of U.S. patent application Ser. No. 13/795,914, filed Mar. 12, 2013, entitled "Multi-Program Playback Status Display,", which claims priority to U.S. provisional application 61/611,483, filed Mar. 15, 2012, entitled "Reception, Recording, Storage, and Manipulation of Multiple Television Channels," the entire disclosure of which is hereby incorporated by reference for all purposes.

BACKGROUND

The advent of the digital video recorder (DVR) and the availability of high-capacity computer-readable storage devices at reasonable prices have made available many possibilities to television programming service providers and television viewers alike. In recent years, television viewers have come to expect the ability to easily customize and manage the recording of television programming via their television receivers.

SUMMARY

In some embodiments, a system for managing stored television programs is presented. The system may include one or more processors. The system may include a memory communicatively coupled with and readable by the one or more processors and having stored therein processor-readable instructions. When executed by the one or more processors, the instructions may cause the one or more processors to cause a recording of a television channel to be stored, wherein the recording of the television channel comprises a plurality of television programs. The instructions may cause the one or more processor to cause a graphical playback status element to be displayed via a display device, the graphical playback status element comprising a start point for each television program of the plurality of television programs within the recording of the television channel.

Embodiments of such a system may include one or more of the following: The plurality of television programs may have been broadcast consecutively on the television channel. The instructions may cause the one or more processor to cause the recording of the television channel to be recorded, wherein the recording of the television channel is recorded from a broadcast of the television channel. The start point for each television program of the plurality of television programs may be denoted by a graphical indicator specific to the television program. For each television program of the plurality of television programs, the graphical indicator may include a graphical showcard. The instructions may cause the one or more processor to receive, from a user, a selection of a graphical showcard for a television program of the plurality of television programs. The instructions may cause the one or more processor to, in response to the selection of the graphical showcard for the television program being received from the user, begin playback of the recording of the television channel at a playback time associated with the television program. The instructions may cause the one or more processor to receive, from a user, a selection of a first television program from the plurality of television programs of the recording of the television channel. The instructions may cause the one or more processor to cause the first television program selected by the user to be presented via the display device.

Additionally or alternatively, embodiments of such a system may include one or more of the following: The instructions may cause the one or more processor to at completion of presentation of the first television program, cause a second television program from the plurality of television programs of the recording of the television channel to be presented. The first television program and the second television program may have been broadcast consecutively. The instructions may cause the one or more processor to receive, from a user, a selection of a first television program from the plurality of television programs of the recording of the television channel. The instructions may cause the one or more processor to cause the first television program selected by the user to be presented via the display device. The instructions may cause the one or more processor to, at completion of presentation of the first television program, cause a selection option to be presented requesting input to indicate whether a second television program from the plurality of television programs of the recording of the television channel is to be presented. The first television program and the second television program may have been broadcast consecutively. The instructions may cause the one or more processor to cause a second recording of a second television channel to be stored, wherein the recording of the second television channel comprises a second plurality of television programs. The instructions may cause the one or more processor to cause a second graphical playback status element to be displayed via the display device simultaneously with display of the graphical playback status element, the second graphical playback status element comprising a start point for each television program of the second plurality of television programs within the second recording of the second television channel.

In some embodiments, a method for managing stored television programs is presented. The method may include storing, by a television receiver, a recording of a television channel, wherein the recording of the television channel comprises a plurality of television programs. The method may include causing a graphical playback status element to be displayed the graphical playback status element comprising a start point for each television program of the plurality of television programs within the recording of the television channel.

Embodiments of such a method may include one or more of the following: The plurality of television programs may have been broadcast consecutively on the television channel. The method may include recording the recording of the television channel, wherein the recording of the television channel is recorded from a broadcast of the television channel. The start point for each television program of the plurality of television programs may have been denoted by a graphical indicator specific to the television program. For each television program of the plurality of television programs the graphical indicator may include a graphical showcard. The method may include receiving, from a user, a selection of a graphical showcard for a television program of the plurality of television programs. The method may include, in response to the selection of the graphical showcard for the television program being received from the user, commencing playback of the recording of the television channel at a playback time associated with the television program. The method may include receiving, from a user, a selection of a first television program from the plurality of television programs of the recording of the television channel. The method may include causing the first television program selected by the user to be presented via a display device. The method may include, at completion of presentation of the first television program, causing a second television program from the plurality of television programs of the recording of the television channel to be presented. The first television program and the second television program may have been broadcast consecutively. The method may include receiving, from a user, a selection of a first television program from the plurality of television programs of the recording of the television channel. The method may include causing the first television program selected by the user to be presented via a display device. The method may include, at completion of presentation of the first television program, causing a selection option to be presented requesting input to indicate whether a second television program from the plurality of television programs of the recording of the television channel is to be presented. The first television program and the second television program may have been broadcast consecutively.

In some embodiments, a non-transitory processor-readable medium for managing stored television programs is presented. The non-transitory processor-readable medium may include processor-readable instructions configured to cause one or more processors to cause a recording of a television channel to be stored, wherein the recording of the television channel comprises a plurality of television programs. The instructions may cause the one or more processors to cause a graphical playback status element to be displayed via a display device, the graphical playback status element comprising a start point for each television program of the plurality of television programs within the recording of the television channel. The start point for each television program of the plurality of television programs is denoted by a graphical indicator specific to the television program.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A television receiver may be configured to record multiple television channels over a period of time. Further, such a television receiver may be configured to record one or more television channels for a period of time during which multiple television programs are broadcast. For example, a television receiver may be configured to record a television channel on a daily basis from 6-10 PM. Such recording may be performed on multiple channels simultaneously. For example, each major television network, such as NBC, CBS, ABC, and FOX, may be recorded nightly during primetime (e.g., 7-10 PM). Such recording may result in a large amount of programming being stored by the television receiver such that the television programming is available for a user to playback via a display device, such as a television or monitor, when desired. However, conventional arrangements for allowing the user to interact with the stored recordings of television programs may be inconvenient, inefficient, and/or undesirable.

In some embodiments, a single file is recorded for a television channel for a given consecutive time period. During this time period, multiple television programs are recorded. As such, the channel-specific file can contain multiple television programs. When a playback status element is displayed, playback progress through the entire file and the particular television program may be displayed. Further, visual indicators, referred to as showcards, may be displayed; each showcard represents a television program within the channel-specific file. As such, if a channel-specific file is devoted to a day's primetime broadcasts on a television channel, a showcard may be displayed for each television program broadcast on the television channel during primetime. In some embodiments, playback status elements may be displayed for multiple television channels simultaneously. For example, if two television channels were recorded over the same period of time, a playback status element may be displayed for each of these television channels simultaneously.

Figure 1:
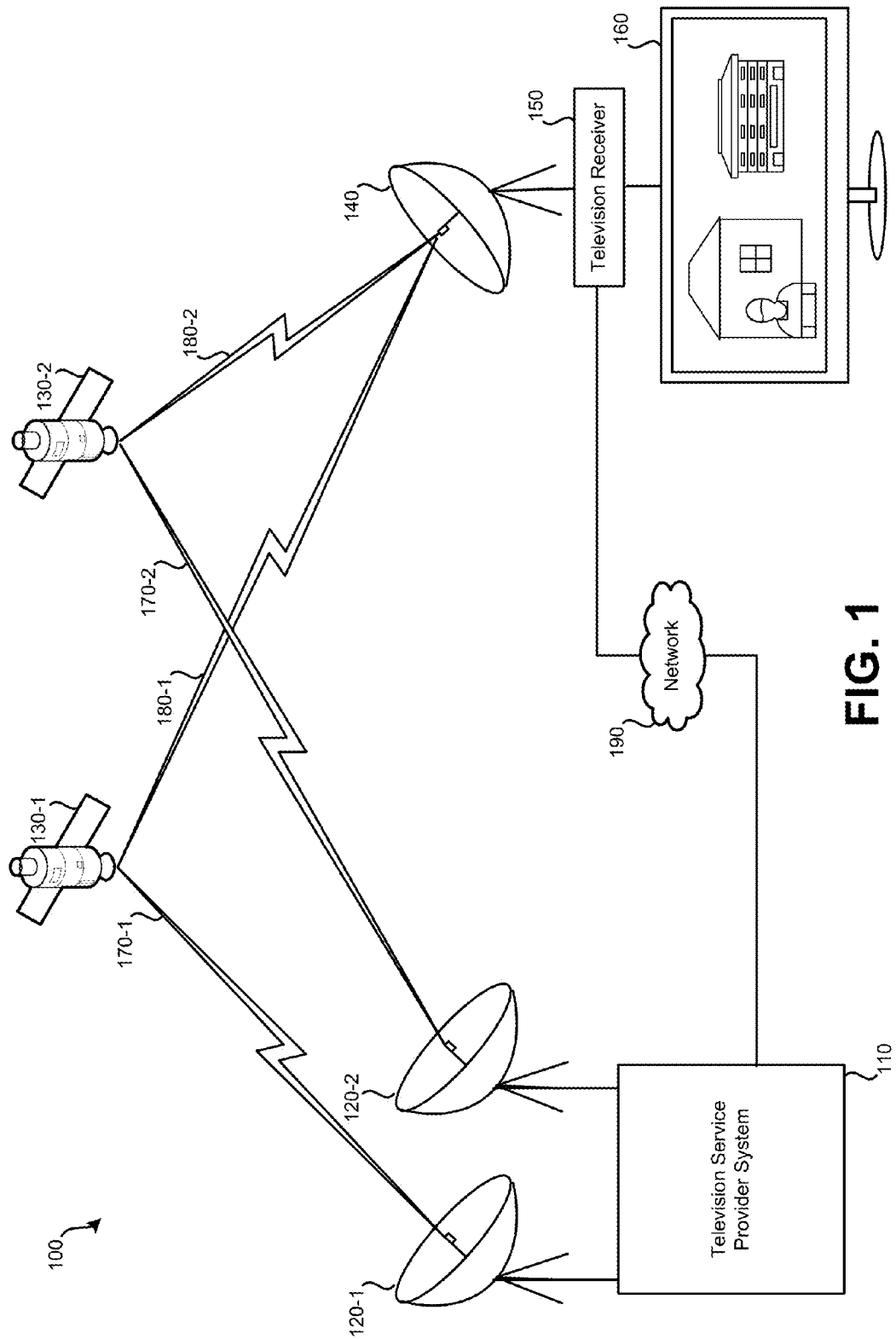
FIG. 1 illustrates an embodiment of a satellite television distribution system.

FIG. 1 illustrates an embodiment of a satellite television distribution system 100. While embodiments detailed herein may be applied to various television distribution systems, including cable and IP, a satellite television distribution system is provided as an example. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from satellites 130.

Television service provider system 110 and satellite transmitter equipment 120 may be operated by a television service provider. A television service provider may distribute television channels, on-demand programming, programming information, and/or other services to users. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder stream 180. Satellites 130 may be in geosynchronous orbit. Each satellite 130 may be in a different orbital slot, such that the signal paths between each satellite, transmitter equipment, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite transmitter equipment 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a time.

Figure 2:
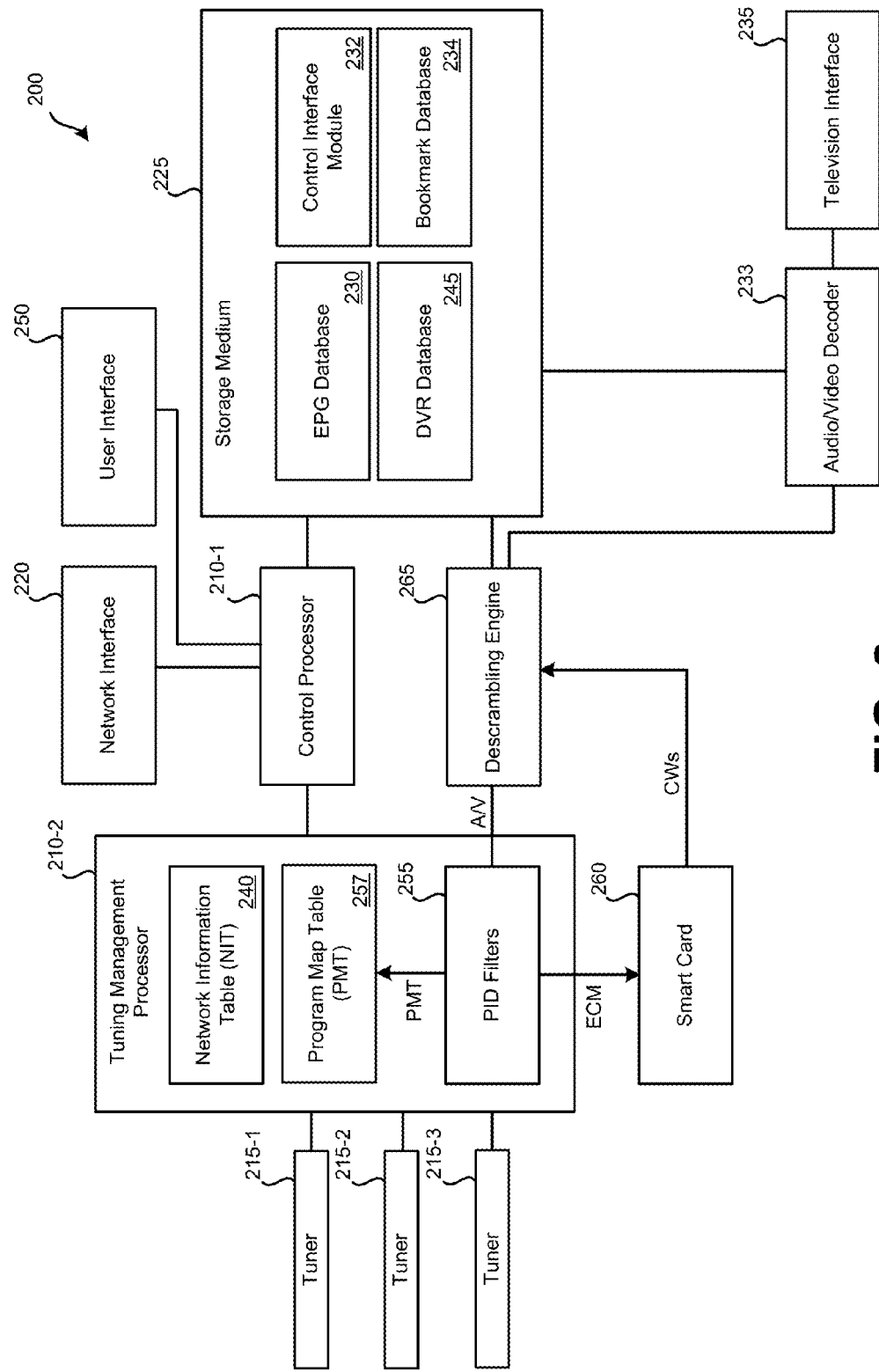
FIG. 2 illustrates an embodiment of a television receiver that is configured to present various graphical interfaces via a display device.

In communication with satellite dish 140 may be one or more sets of receiving equipment. Receiving equipment may be configured to decode signals received from satellites 130 via satellite dish 140 for display on a display device, such as display device 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of television receiver 150. As such, television receiver 150 may decode signals received via satellite dish 140 and provide an output to display device 160. FIG. 2 provides additional detail of a television receiver. A television receiver is defined to include set-top boxes (STBs) and also circuitry having similar functionality that may be incorporated with another device. For instance, circuitry similar to that of a television receiver may be incorporated into a television. As such, while FIG. 1 illustrates an embodiment of television receiver 150 as separate from display device 160, it should be understood that in other embodiments, similar functions may be performed by a television receiver integrated with display device 160.

Display device 160, which may be a television, monitor, or some other display device, may be used to present video and/or audio decoded by television receiver 150. Television receiver 150 may also output a display of one or more interfaces to display device 160, such as an electronic programming guide (EPG).

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay thirty-two transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. Television receiver 150 may decode the received transponder stream. As such, depending on which television channel(s) are desired, a transponder stream from a different satellite (or a different transponder of the same satellite) may be accessed and decoded by television receiver 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and television receiver 150. Via such a secondary communication channel, bidirectional exchange of data may occur. As such, data may be transmitted to television service provider system 110 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

FIG. 2 illustrates an embodiment of television receiver 200, which may typically be in the form of a separate device configured to be connected with a presentation device, such as a television. Embodiments of television receiver 200 may include set top boxes (STBs). As previously noted, in addition to being in the form of an STB, a television receiver may be incorporated into another device, such as a television. For example, a television may have an integrated television receiver (which does not involve an external STB being coupled with the television). An STB may contain some or all of the components of television receiver 200 and/or may be able to perform some or all of the functions of television receiver 200. Accordingly, instances in this document referring to an STB and steps being performed by an STB may also be performed, more generally, by a television receiver.

FIG. 2 illustrates a block diagram of an embodiment of television receiver 200 that is configured to record omnibus channel files and extract a television program from a recorded omnibus channel file. Television receiver 200 may be television receiver of FIG. 1 and may be in the form of an STB that communicates with a display device such as a television. Television receiver 200 may be incorporated as part of a television, such as display device 160 of FIG. 1. Television receiver 200 may include: processors 210 (which may include control processor 210-1 and tuning management processor 210-2), tuners 215, network interface 220, non-transitory computer-readable storage medium 225, electronic programming guide (EPG) database 230, control interface module 232, bookmark database 234, television interface 235, networking information table (NIT) 240, digital video recorder (DVR) database 245, user interface 250, PID filters 255, smart card 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID filters 255 may be handled by separate hardware from program map table 257.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may initiate recording of a television channel by sending a record command along with an indication of the television channel to be recorded to tuning management processor 210-2. Control processor 210-1 may not send a second record command (if additional recording is to begin at the same time) until an acknowledgement that recording of the first television channel has successfully been received and initiated by tuning management processor 210-2. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to audio/video decoder 233 for output to a presentation device, such as a television.

Control processor 210-1 may also communicate with network interface 220 and user interface 250. Control processor 210-1 may handle incoming data from network interface 220 and user interface 250. Additionally, control processor 210-1 may be configured to output data via network interface 220.

Tuners 215 may include one or more tuners used to tune to television channels, such as television channels transmitted via satellite or cable. In the illustrated embodiment of television receiver 200, three tuners are present (tuner 215-1, tuner 215-2, and tuner 215-3). Each tuner contained in tuners 215 may be capable of receiving and processing a transport stream of data from a satellite transponder (or a cable RF channel) at a given time. This transport stream may contain audio and video data for multiple television channels in addition to other data. As such, a single tuner may tune to a single transponder (or, for a cable network, a single cable RF channel). If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be used for tuning.

Network interface 220 may be used to communicate via an alternate communication channel with a television service provider. For example, the primary communication channel may be via satellite (which may be unidirectional to the STB) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220.

Storage medium 225 may represent a non-transitory computer-readable storage medium. Storage medium 225 may include memory and/or a hard drive. Storage medium 225 may be used to store information received from one or more satellites and/or information received via network interface 220. Storage medium 225 may store information related to EPG database 230, and/or DVR database 245. In some embodiments, storage medium 225 may also be used to store various tables, such as NIT 240, PMT 257, and/or PAT. Recorded television programs may be stored using storage medium 225. Storage medium 225 may be partitioned or otherwise divided such that predefined amounts of storage medium 225 are devoted to storage of omnibus channel files and user-selected television programs.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously.

In addition to being used to provide users with information about scheduled programming, information from EPG database 230 may be used to determine when television programs begin and end for the purposes of recording. For instance, if a channel-specific file is recorded that contains multiple television programs, the start and end of time of specific television programs within the channel-specific file may be based on the start and end times indicated in the EPG. Other data may be stored for the EPG that may be useful in managing channel-specific files, such as series identifiers and episode identifiers (which may be used by a television service provider to identify particular television programs).

Audio/video decoder 233 may serve to convert encoded video and audio into a format suitable for output to a display device. For instance, audio/video decoder 233 may receive MPEG video and audio from storage medium 225 or descrambling engine 265 to be output to a television. MPEG video and audio from storage medium 224 may have been recorded to DVR database 245 as part of a previously-recorded television program. Audio/video decoder 233 may convert the MPEG video and audio into a format appropriate to be displayed by a television or other form of display device and audio into a format appropriate to be output from speakers, respectively.

Television interface 235 may serve to output a signal to a television (or another form of display device) in a proper format for display of video and playback of audio. As such, television interface 235 may output one or more television channels, and stored television programming from storage medium 225 (e.g., television programs from DVR database 245 and/or information from EPG database 230) to a television for presentation.

The Network Information Table (NIT) 240 may store information used by television receiver 200 to access various television channels. NIT 240 may be stored locally by a processor, such as by tuning management processor 210-2. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers, frequency identifiers and/or transponder identifiers for various television channels. In some embodiments, NIT 240 may contain additional data or additional tables may be stored by the television receiver. For example, specific audio PIDs and video PIDs may not be present in NIT 240; a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, video PIDs, and/or ECM (entitlement control message) PIDs for television channels that are transmitted on a transponder frequency.

Table 1 provides a simplified example of NIT 240 for several television channels. It should be understood that in other embodiments, many more television channels may be represented in NIT 240. NIT 240 may be periodically updated by a television service provider. As such, television channels may be reassigned to different satellites and/or transponders, and television receiver 200 may be able to handle this reassignment as long as NIT 240 is updated.

TABLE 1

| Channel | Satellite | Transponder |
|---------|-----------|-------------|
| 4 | 1 | 2 |
| 5 | 2 | 11 |
| 7 | 2 | 3 |
| 13 | 2 | 4 |

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, a known PMT PID may be used to retrieve a program map table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 240. Additional information on how NIT 240, as indicated in Table 1, may be used is provided in reference to FIG. 3.

A Digital Video Recorder (DVR) may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television stations. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

The DVR functionality of control processor 210-1 may have multiple modes. First, the DVR functionality of control processor 210-1 may be configured to record individual television programs selected by a user to DVR database 245. Using EPG database 230, a user may select a particular television program. Based on the date, time period, and television channel indicated by EPG database 230, Control processor 210-1 may record the associated television program to DVR database 245. Second, DVR database 245 may be used to store recordings of predefined periods of time on one or more television channels. These predefined periods of time may include one or more television programs. For example, primetime on a particular television network may be recorded each weekday night. Further, multiple television channels may be recorded for such predefined periods of time. Such recording of television channels for predefined periods of time may be defined by the television service provider.

As an example of this second mode of DVR functionality, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight. If a television program is selected for recording by a user and is also specified for recording by the television service provider, the user selection may serve as an indication to save the television program for an extended time (beyond the time which the predefined recording would otherwise be saved).

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with a particular television channel. Particular data packets, referred to as entitlement control messages (ECMs) may be periodically transmitted. ECMs may be associated with another PID and may be encrypted; television receiver 200 may use smart card 260 to decrypt ECMs. Decryption of an ECM may only be possible if the user has authorization to access the particular television channel associated with the ECM. When an ECM is determined to correspond to a television channel being stored and/or displayed, the ECM may be provided to smart card 260 for decryption.

When smart card 260 receives an encrypted ECM, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260. Smart card 260 may be permanently part of television receiver 200 or may be configured to be inserted and removed from television receiver 200.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite), a PID filter may be created based on a PID of PMT data. The PID of PMT data packets may be known because it is stored as part of NIT 240 or another table, such as a PAT. From the PMT data packets, PMT may be constructed by tuning management processor 210-2. Table 2 provides an exemplary extract of a PMT. PMT 257 may be specific to a particular transponder. As such, if tuning to a different transponder occurs, a new PMT may be created for the different transponder.

TABLE 2

| Channel | Video PID | $1^{st}$ Audio PID | $2^{nd}$ Audio PID |
|---|---|---|---|
| 4 | 1003 | 2383 | 2119 |
| 5 | 2993 | 2727 | 2728 |
| 7 | 9238 | 1233 | 0129 |
| 13 | 0012 | 9348 | — |

Accordingly, based on the information present in PMT 257, the audio and video PIDs for specific television channels may be identified. A television channel may have multiple audio PIDs due to a second audio program (SAP), which may be in a different language.

It should be understood that the values provided in Table 2 are for example purposes only. Actual values may vary. Additional information or less information may also be stored in PMT 257.

PID filters 255 may be configured to filter data packets based on PIDs. In some embodiments, PID filters 255 are created and executed by tuning management processor 210-2. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets, corresponding to a television channel that is not desired to be stored or displayed by the user, may be ignored by PID filters 255. As such, only data packets corresponding to the one or more television channels desired to be stored and/or displayed may be filtered and passed to either descrambling engine 265 or smart card 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2.

Descrambling engine 265 may use the control words output by smart card 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to audio/video decoder 233 for output to a television or other presentation equipment via television interface 235.

Television receiver 200 may be configured to record channel-specific files that contain multiple television programs. For example, processors 210 may be configured to cause multiple television channels to be recorded to channel-specific files, in which each file contains multiple television programs. These channel-specific files may be stored by DVR database 245. A user may be permitted to select a channel-specific file or a specific television program from within a channel-specific file for playback.

Control interface module 232 may contain data used to create various user interfaces that allow a user to interact with stored channel-specific files. For example, embodiments of such interfaces are described in relation to FIGS. 3-10. Bookmark database 234 may contain bookmark files. A bookmark file may correspond to a specific channel-specific file and may contain data about the television programs present within the channel-specific file. A bookmark file may be created based on EPG data from EPG database 230. The bookmark file may indicate locations within the corresponding channel-specific file as to where television programs, according to the EPG data, were scheduled to begin. Bookmark files may be created by control processor 210-1 using data from EPG database 230.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Also, while television receiver 200 may be used to receive, store, and present television channels received via a satellite, it should be understood that similar components may be used to receive, store, and present television channels via a cable network.

Figure 3:
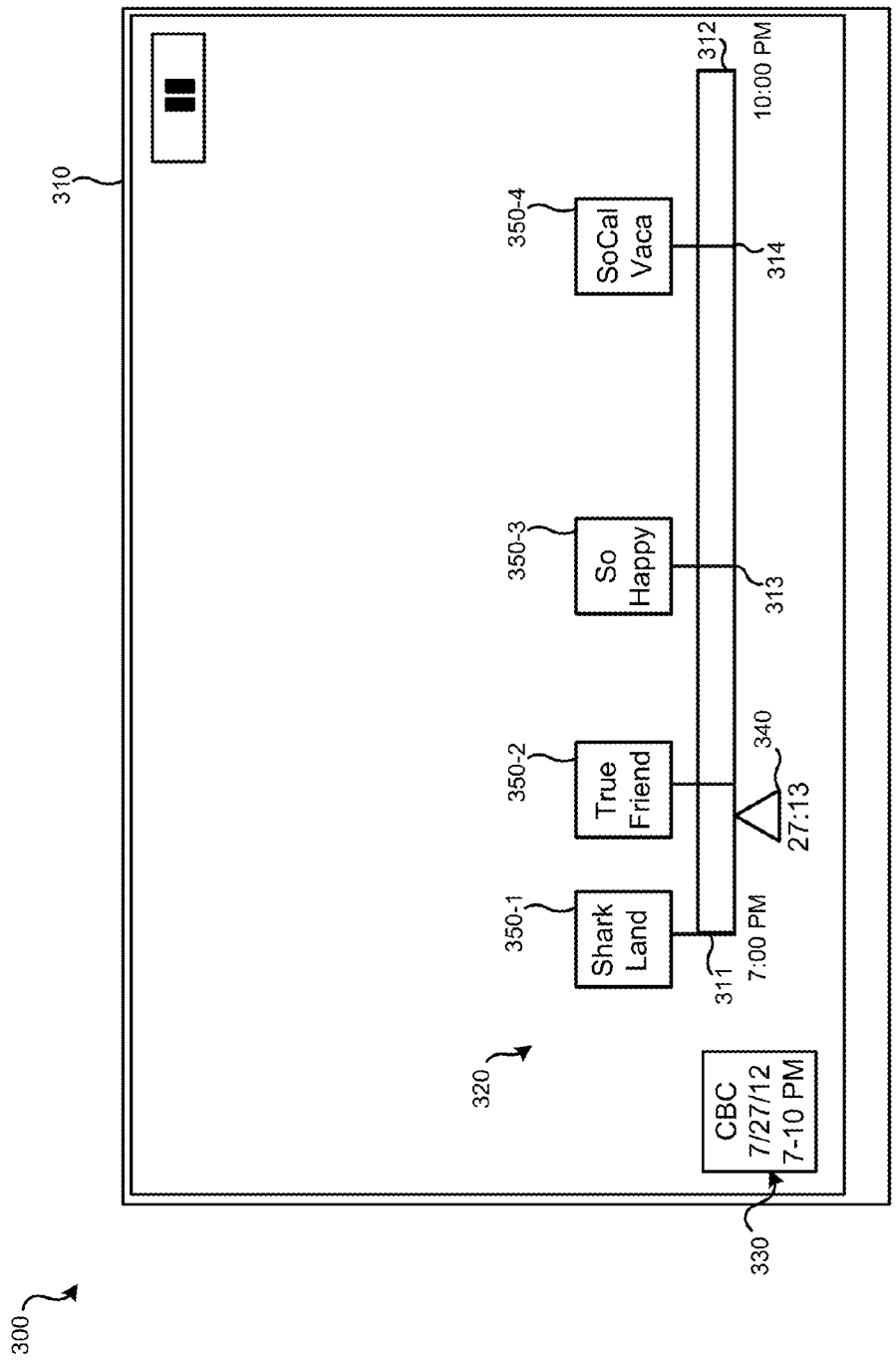
FIG. 3 illustrates an embodiment of a control for managing playback of stored television programs.

FIG. 3 illustrates an embodiment 300 of a control for managing playback of stored television programs. Embodiment 300 may be output by a television receiver, such as television receiver 200 of FIG. 2, based on data received via a television distribution system, such as satellite television distribution system 100 of FIG. 1. Embodiment 300 illustrates a display device 310 presenting a playback status element 320. In embodiment 300, a television channel-specific file is being played back by a television receiver. The television receiver may have previously recorded a file that includes multiple television programs broadcast simultaneously on the television channel. For example, the television receiver may have recorded a television channel from 7-10 PM, during which multiple television programs were broadcast on the television channel. Information about the television programs broadcast on the television channel during the period of time during which recording occurred may be stored to a bookmark file by the television receiver. Data for the bookmark file may have been created at least partially based on EPG data, which may be from EPG database 230. In embodiment 300, a television channel ("CBC"), was recorded from 7-10 PM. During this period of time, four television programs were broadcast: television program "Sharkland" indicated by showcard 350-1, television program "True Friend" indicated by showcard 350-2, television program "So Happy" indicated by showcard 350-3, and television program "SoCal Vaca" indicated by showcard 350-4.

In illustrated embodiment 300, playback status element 320 includes a progress bar, which indicates a start point 311 and an end point 312 for the channel-specific file. Start point 311 may correspond to the time at which recording of the television channel commenced. End point 312 may correspond to the time at which recording of the television channel ended. In some embodiments, additionally or alternatively to indicating the time at which recording commenced and ended, a recording timer may be indicated that has the start time at time "0" and the end point being the amount of time of recording. For example, in illustrated embodiment 300, the end point may be three hours. Also within playback status element 320, start points and end points for particular television programs are indicated, such as program start point 313 and program end point 314 for the television program "So Happy." Program end point 314 may also serve as the start point for a television program broadcast after "So Happy."

Channel status 330 indicates the television channel, date, and time period for which the television channel was recorded. The time period may include time periods during which multiple television programs were broadcast on the television channel consecutively. To be clear, "television program" is defined to include content broadcast on a television channel. It may be a one-time production or part of a periodically recurring series. Television programs are typically, at minimum, scheduled for thirty minutes, including commercial breaks. Television programs do not include commercials, which may be broadcast before, after, and during the broadcast of television programs. For example, if a television program is scheduled for thirty minutes, that broadcast period may include several minutes at the beginning and/or end of commercials. Further, during the broadcast of the television program, multiple commercials may be present.

In some embodiments, by selecting channel status 330, a user may be permitted to select a different television channel, date, and/or time period for playback. For example, multiple other television channels may have been recorded during the same time period and/or date as channel "CBC." Recordings of these television channels may also be available for playback in the form of a channel-specific file that contains multiple television programs. As such, if channel status 330 is selected, a user may be prompted to select a different channel, date, and/or time period.

If one or more other television channels were recorded during the same time period, these other television channels may have been received by the television receiver via a same tuner. A single tuner of a television receiver may be used to receive each of the television channels over a same period of time for recording if the multiple television channels are broadcast as part of a same transponder stream. As such, multiple television channels may be received and recorded while limiting the number of tuners required to receive the television channels to one.

In illustrated embodiment 300, playback status element 320 includes a progress bar on which the times at which various television programs begin are indicated. It should be understood that in other embodiments, playback status element 320 may include a display arrangement other than a progress bar. In illustrated embodiment 300, an indication of a start time of each television program within the channel-specific file is indicated. These start times may be based on the scheduled start time as indicated by EPG data. EPG data may be used to create a bookmark file containing information about each television program present within the channel-specific file (e.g., a start time, a name of the television program, graphical data for a showcard, etc.)

The start time of each television program is indicated in playback status element 320 by a showcard. A showcard may include text and/or a graphic that is indicative of the television program. For simplicity, in embodiment 300, text that indicates the title of the television program is used. In other embodiments, a graphic that is indicative of the television program may be used. For example, when a television program is selected or highlighted based on user input in an EPG display created by a television receiver, "poster art" for the television program may be presented. This poster art may show an image selected to represent the television show, such as the major actors and/or actresses from the television show posing and/or may include the title of the television program. This poster art may be received and stored by the television receiver for use in an EPG display. This poster art may be received by the television receiver via the television service provider's network, such as a satellite-based television distribution network. In addition to using such poster art for display when the television program is selected via an EPG display, the poster art may be used for showcards 350. In some embodiments, a screenshot from the recorded television program may be used for the showcard. This screenshot may be selected by the television service provider, be randomly chosen, or be selected from a preselected point in time within the recording of the television program.

Showcard 350-1 indicates that the television show "Shark Land" begins at 7:00 PM. Showcard 350-2 indicates that the television show "True Friend", which airs immediately after "Shark Land" was recorded as part of the same channel-specific file, begins at a later time. In some embodiments, a time may be indicated for the start of "True Friend." For each showcard, some form of indicator may be present on a progress bar, such as a line associated with each showcard 350, which indicates the point on the progress bar at which the television programs associated with the showcard begins. In illustrated embodiment 300, the start of "True Friend," as indicated by showcard 350-2 signals the end of "Shark Land." The amount of space along the progress bar between the indicated start points of television programs may be indicative of the length of time of the television program (e.g., twice as much space may be present for a television program that is an hour long compared to a television program that is 30 minutes long).

Playback indicator 340 indicates the current point in playback. As such, while, for simplicity, not illustrated in FIG. 3, a frame from "Shark Land" which is 27 minutes, thirteen seconds into the scheduled broadcast time of "Shark Land" may be displayed behind playback status element 320. As the point in playback of the channel-specific file changes, the location of playback indicator 340 may change. In illustrated embodiment 300, continuous playback may result in the playback indicator 340 moving from start point 311 to end point 312 over a time period of three hours.

Playback status element 320 may only be displayed when a user has provided a "pause" or "stop" command to the television receiver regarding playback of the channel-specific file. In some embodiments, while the channel-specific file is being played back, playback status element 320 may be displayed. Such display may be based on a user providing a "playback status" or similar command. In some embodiments, whenever a new television program begins or ends being played back, playback status element 320 is displayed for a predefined period of time (e.g., 10 seconds).

Playback status element 320 may be presented before the entire channel-specific file has been recorded. For example, a user may be permitted to begin playback of a portion of the channel-specific file before the entire file has been recorded. As an example, a user may be permitted to watch "Shark Land" while recording of the file (e.g., a later portion of "Shark Land" or a later broadcast television program) is occurring. Portions of the channel-specific file that have yet to be recorded may be displayed differently in playback status element 320. For instance, portions of the status bar and/or showcards that correspond to unrecorded portions of the channel-specific file may be grayed out to indicate unavailability. Similar playback during recording may also occur in relation to the other embodiments detailed herein.

The television program names, television channel name, number of television programs, time period, and the specific arrangement of graphical elements of embodiment 300 are for example purposes only. It should be understood that the examples and details provided in relation to embodiment 300 may be applied to various implementations of similar presentation techniques that allows a user to interact with recorded television programs.

Figure 4:
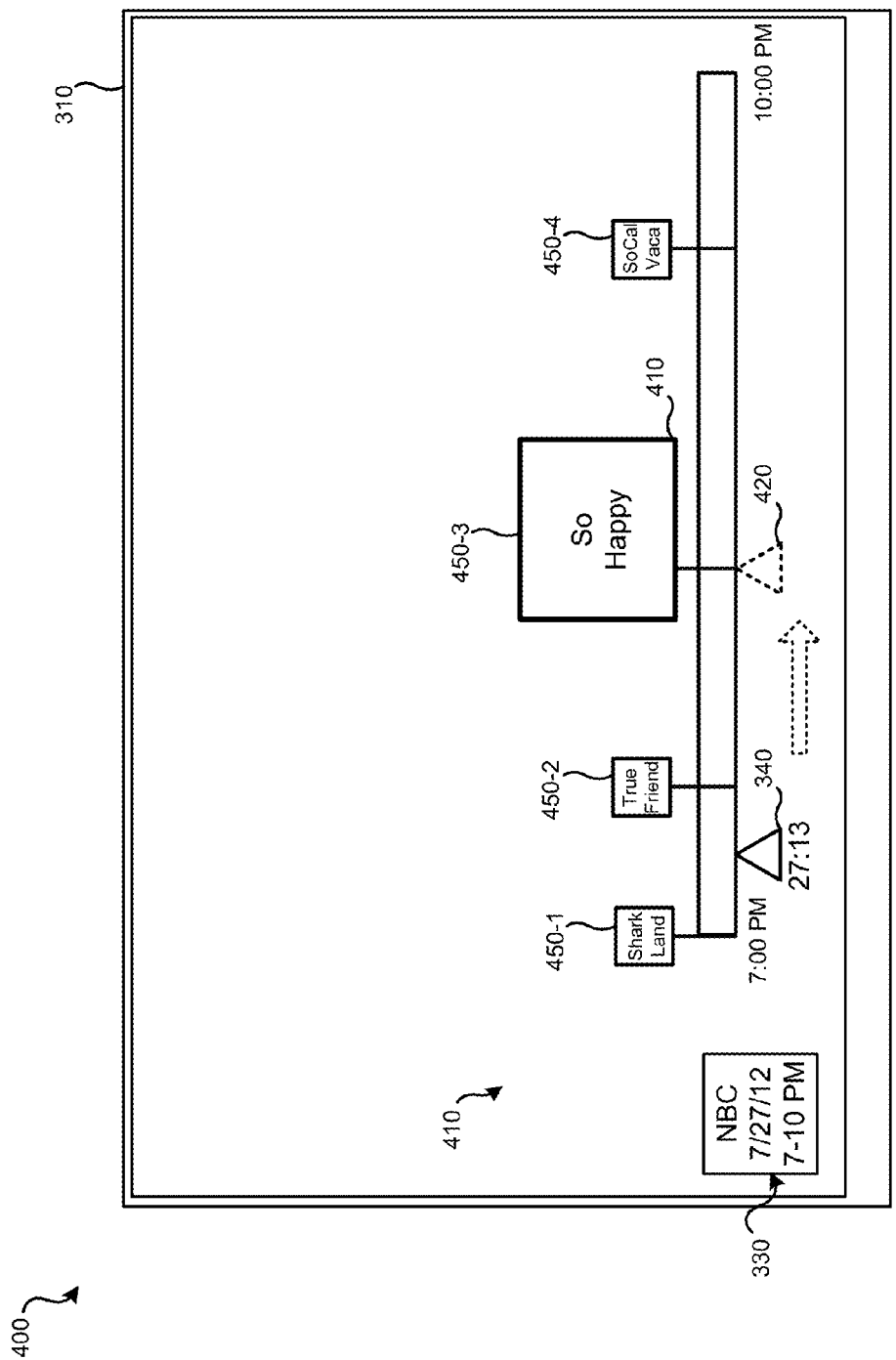
FIG. 4 illustrates another embodiment of a control for managing playback of stored television programs.

FIG. 4 illustrates an embodiment 400 of a control for managing playback of stored television programs. Embodiment 400 may be output by a television receiver, such as television receiver 200 of FIG. 2, based on data received via a television distribution system, such as satellite television distribution system 100 of FIG. 1. Due to size limitation of the display device presenting a playback status element, such as playback status element 320, a desire to obscure less of a television program being presented in the background, and/or some other reason, showcards may be decreased in size or hidden unless selected by a user or currently being played. It should be understood that embodiment 400 may be an alternate embodiment of embodiment 300 of FIG. 3; as such, aspects of embodiment 300 may be incorporated with embodiment 400.

In playback status element 410 of FIG. 4, a user has selected "So Happy." This user input may involve a user providing input via a remote control that is in communication with the television receiver that output playback status element 410. In embodiment 400, the selected showcard 450-3 is presented larger (in a large format) than other showcards (which are presented in a small format). As such, showcard 450-3 is larger (thus making its graphics and/or text more easily viewable) than showcards 450-1, 450-2, and 450-3. If a user provides input to the television receiver selecting a different showcard, such as showcard 450-4, showcard 450-3 may be shrunk in size while showcard 450-4 would be grown in size. Whether a showcard of showcards 450 is displayed in a small or large format may affect its content: graphics and/or text may be present in a large format showcard while only text may be shown in a small format showcard. In some embodiments, poster art for a television program may be presented only if the showcard is a large format showcard.

A user may be able to select a showcard by manipulating a user input device, such as a remote control. When a showcard is selected, such as showcard 450-3, it may be presented in a large format. A second user input, such as a "click" or other "OK" selection, may result in the television program associated with the selected showcard being played. In embodiment 400, a user has selected showcard 450-3. Input may be received from the user indicating playback of "So Happy" is to commence, thus resulting in playback indicator 340 jumping to the time associated with the beginning of "So Happy." Thus playback indicator 340 would become playback indicator 420. This start time may be based on a bookmark file created based on EPG data stored by the television receiver. To a user, the change results in a different television program commencing playback; functionally, the television receiver is changing a playback location within a single channel-specific file. In some embodiments, showcard 450-3 may remain in a large format while the associated television program is being played back. As such, the television program currently being played back and/or a selected showcard may be presented in a large format.

It should be understood that in other embodiments, other arrangements may be used for emphasizing a showcard rather than presenting it in a large format. For instance, showcards may be shown in black and white, unless selected. If selected, the showcards may be shown in color. Other uses of color for highlighting or selecting may be possible. In some embodiments, if a television program is not selected, its associated showcard may be hidden. As such, in an alternate of embodiment 400, showcards 450-1, 450-2, and 450-4 may not be displayed. In some embodiments, such showcards which are not selected may be more transparent than showcard 450-3 (thus allowing a television program being displayed behind playback status element 410 to be viewed.

The television program names, television channel name, number of television programs, time period, and the specific arrangement of graphical elements of embodiment 400 are for example purposes only. It should be understood that the examples and details provided in relation to embodiment 400 may be applied to various implementations of similar presentation techniques that allow a user to interact with recorded television programs.

Figure 5:
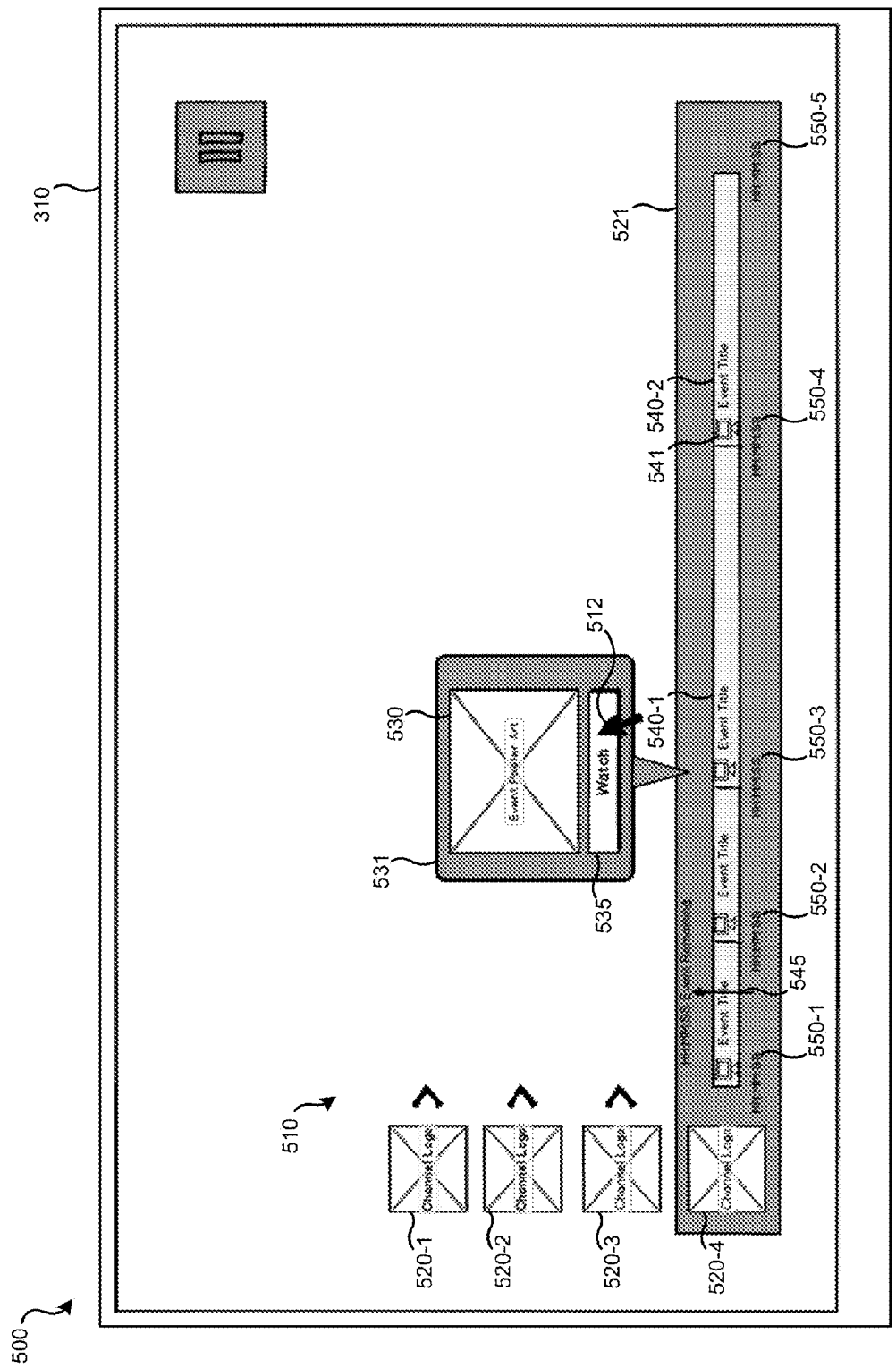
FIG. 5 illustrates an embodiment of a control for managing playback of stored television programs from multiple television channels.

FIG. 5 illustrates an embodiment 500 of a control for managing playback of stored television programs from multiple television channels. Embodiment 500 may be output by a television receiver, such as television receiver 200 of FIG. 2, based on data received via a television distribution system, such as satellite television distribution system 100 of FIG. 1. Embodiment 500 illustrates an alternative control which may be presented to a user to control playback of multiple television programs. It should be understood that embodiment 500 may be an alternate embodiment of embodiment 300 of FIG. 3 and/or embodiment 400 of FIG. 4; as such, aspects of embodiments 300 and 400 may be incorporated with embodiment 400.

Playback status element 510 indicates multiple television channels which were recorded during an overlapping time period on a same day. Channel-specific indicator 520-1, channel-specific indicator 520-2, channel-specific indicator 520-3, and channel-specific indicator 520-4 are each associated with a different television channel recorded during a period of time. Each of these television channels may have been recorded over a same time period. Each of these television channels may have been received for recording using a single tuner of a television receiver. Each channel-specific indicator of channel-specific indicators 520 may have text and/or graphics specific to the television channel. As an example, a channel-specific indicator for NBC may be NBC's peacock graphic, while CBS's channel-specific indicator could be the CBS "eye" graphic. In illustrated embodiment 500, the channel associated with channel-specific indicator 520-4 is selected for playback control, as indicated by selection graphic 521 highlighting details of a file associated with channel-specific indicator 520-4. A user may be permitted to select another television channel for playback by selecting a different channel-specific indicator using a user input device. Each channel-specific indicator of channel-specific indicators 520 may be associated with a particular file recorded over a time period for the television channel. A file covering a same time period on a same day may have been recorded by the television receiver for each of the television channels. In some embodiments, a single tuner of the television receiver may have been used to receive each of the four channels over the same period of time. A separate file may be created for each channel. As such, a selection of a channel-specific indicator of channel-specific indicators 520 may result in a different channel-specific file being selected for playback.

Since channel-specific indicator 520-4 is selected, details regarding playback of the associated channel-specific file are displayed via selection graphic 521. Each television program present within this channel-specific file is indicated. For example, television program 540-1 has text indicating the title of a television program within the television channel-specific file. Times 550 indicate start and end times for the associated channel-specific file (time 550-1 and time 550-5) and individual television programs within the channel-specific file. For example, television program 540-1 begins at time 550-3 and ends at time 550-4. Graphic 541 may be associated with television program 540-2. Graphic 541 may be an icon associated with the specific television program, may indicate the type of television program (e.g., sitcom, drama, movie), may indicate a rating of the television program (e.g., G, PG, R), or may have some other meaning Playback indicator 545 indicates the current playback location within the channel-specific file being played back. A time may be presented that is associated with playback indicator 545, the time indicating the time remaining in the playback of the channel-specific file and/or the time remaining in the playback of the specific television program.

In illustrated embodiment 500, only a single showcard is presented at a given time. As such, by selecting a television program 540-1, showcard 530 may be presented, with poster art specific to that television program. A user may select graphical element 535 to cause the television receiver to commence playback of television program 540-1. In illustrated embodiment 500, the user may be permitted to manipulate cursor 512 to provide input via playback status element 510. Showcard 530 and graphical element 535 may be presented as part of pop-up 531, which is specific to television program 540-1. The content of pop-ups for other television programs may vary.

User input, such as a user manipulating an up or down arrow on a user input device, may result in a channel-specific file associated with a different television channel being selected. Each of these other channel-specific files may have been recorded during a same period of time as the television channel associated with channel-specific indicator 520-4. If another television channel is selected, such as the channel associated with channel-specific indicator 520-2, a status bar associated with the channel represented by channel-specific indicator 520-2 may be presented. The television programming, start times, and end times then presented correspond to the television channel represented by channel-specific indicator 520-2. In order to keep the status bar located at the bottom of the screen (which may be to limit how obscuring of the presently-displayed television program), channel-specific indicator 520-2 may be moved to the illustrated location of channel-specific indicator 520-4. In other embodiments, the status bar may be presented directly next to the channel-specific indicator 520-2 at the location illustrated.

The television program names, television channel name, number of television programs, time period, and the specific arrangement of graphical elements of embodiment 500 are for example purposes only. It should be understood that the examples and details provided in relation to embodiment 500 may be applied to various implementations of similar presentation techniques that allow a user to interact with recorded television programs.

Figure 6:
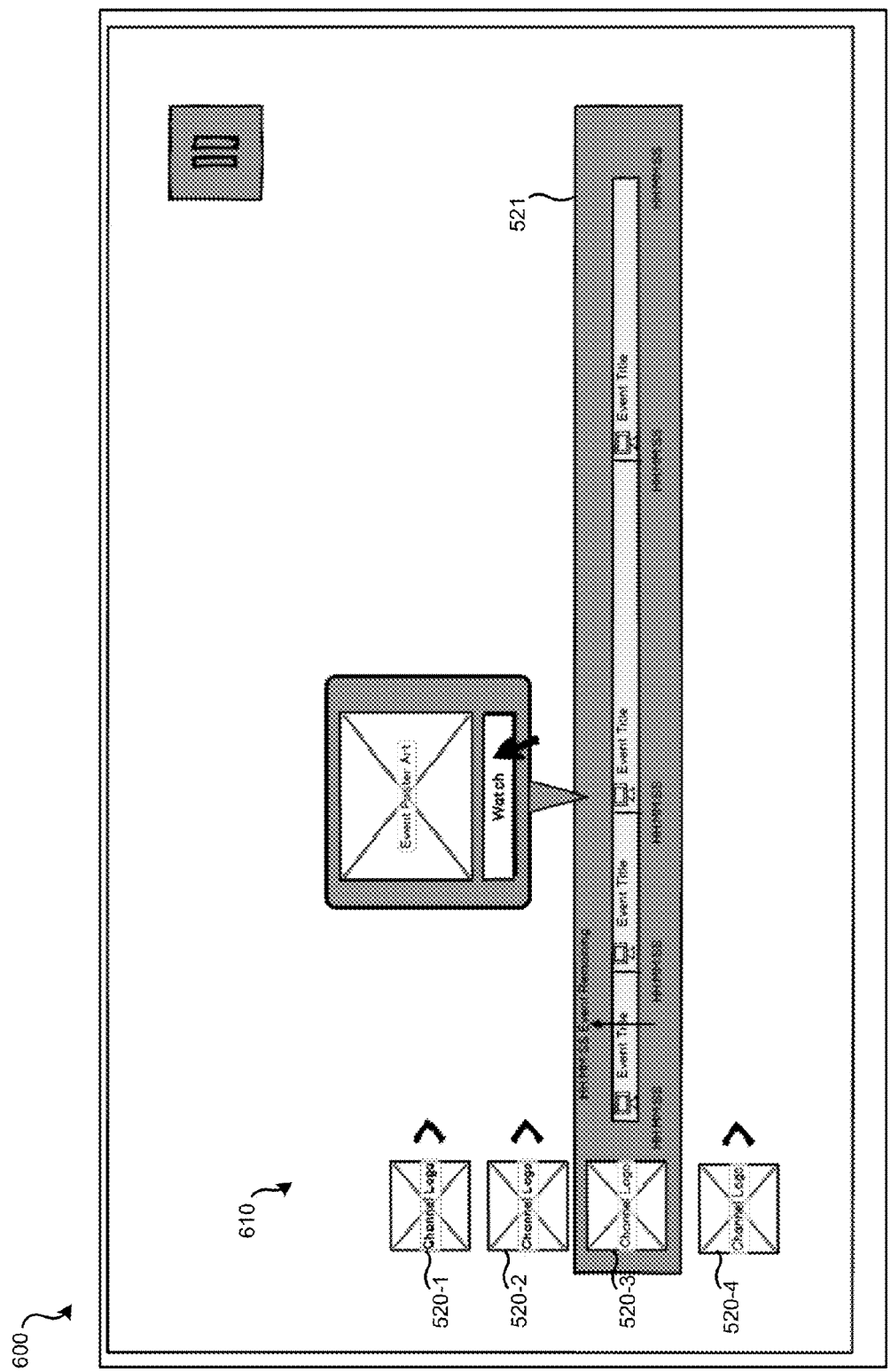
FIG. 6 illustrates another embodiment of a control for managing playback of stored television programs from multiple television channels.

FIG. 6 illustrates another embodiment 600 of a control for managing playback of stored television programs from multiple television channels. Embodiment 600 may be output by a television receiver, such as television receiver 200 of FIG. 2, based on data received via a television distribution system, such as satellite television distribution system 100 of FIG. 1.

In embodiment 600, a user may have selected the television channel associated with channel indicator 520-3. As such, selection graphic 521 now displays details related to the television channel associated with channel indicator 520-3. To do this, the television receiver may have access to the bookmark file for details about the contents of the channel-specific file associated with channel-specific indicator 520-3. The bookmark file may contain details such as start and end times for television programs, the titles for television programs, poster art for the television programs, and/or other EPG which may be presented to the user. In some embodiments, the offset data, which indicates a file position at which the television program begins, may be stored as part of the bookmark file. This offset data may have been identified as the channel-specific file was being recorded. For example, when a particular television program has begun recording (according to a start time indicated in the EPG data), a "check size" command may be processed to determine at what point in the sequential file the television program begins. Further, the location of selection graphic 521 has been moved to correspond to a channel-specific indicator 520-3. The start times, end times, television programs, and showcards may be specific to the television programs stored as part of the channel-specific file linked with channel-specific indicator 520-3. The time period during which this channel-specific file was recorded may overlap or match the time period during which the channel-specific file associated with channel-specific indicator 520-4 was recorded.

In embodiments 500 and 600, selection graphic 521 only displays an indication of a single channel-specific file's content at a given time. In other embodiments, it should be understood that an indication of the content of multiple television channels may be presented simultaneously by a television receiver. For example, a status bar for each channel-specific indicator may be presented simultaneously. In some embodiments, two, three, or four status bars may be presented simultaneously as part of playback status element 610.

In some embodiments, multiple television programs may be played back simultaneously, such as via a picture-in-picture (PIP) arrangement or a split-screen arrangement. For example, a user may indicate a first television program using playback status element 610 for primary playback and the user may indicate a second television program (which was recorded as part of the same channel-specific file or a different channel-specific file) for secondary playback (e.g., in a small portion of the screen). Such an arrangement may be useful if the user is watching sports and wants to watch a less desired game via a PIP arrangement. Therefore, it may be possible for a user to use playback status element 610 to select, for simultaneous playback, multiple television programs which were: broadcast concurrently on different channels, broadcast at different times of the same television channel, and/or broadcast on different television channels at different dates/times.

The television program names, television channel name, number of television programs, time period, and the specific arrangement of graphical elements of embodiment 600 are for example purposes only. It should be understood that the examples and details provided in relation to embodiment 600 may be applied to various implementations of similar presentation techniques that allow a user to interact with recorded television programs.

Figure 7:
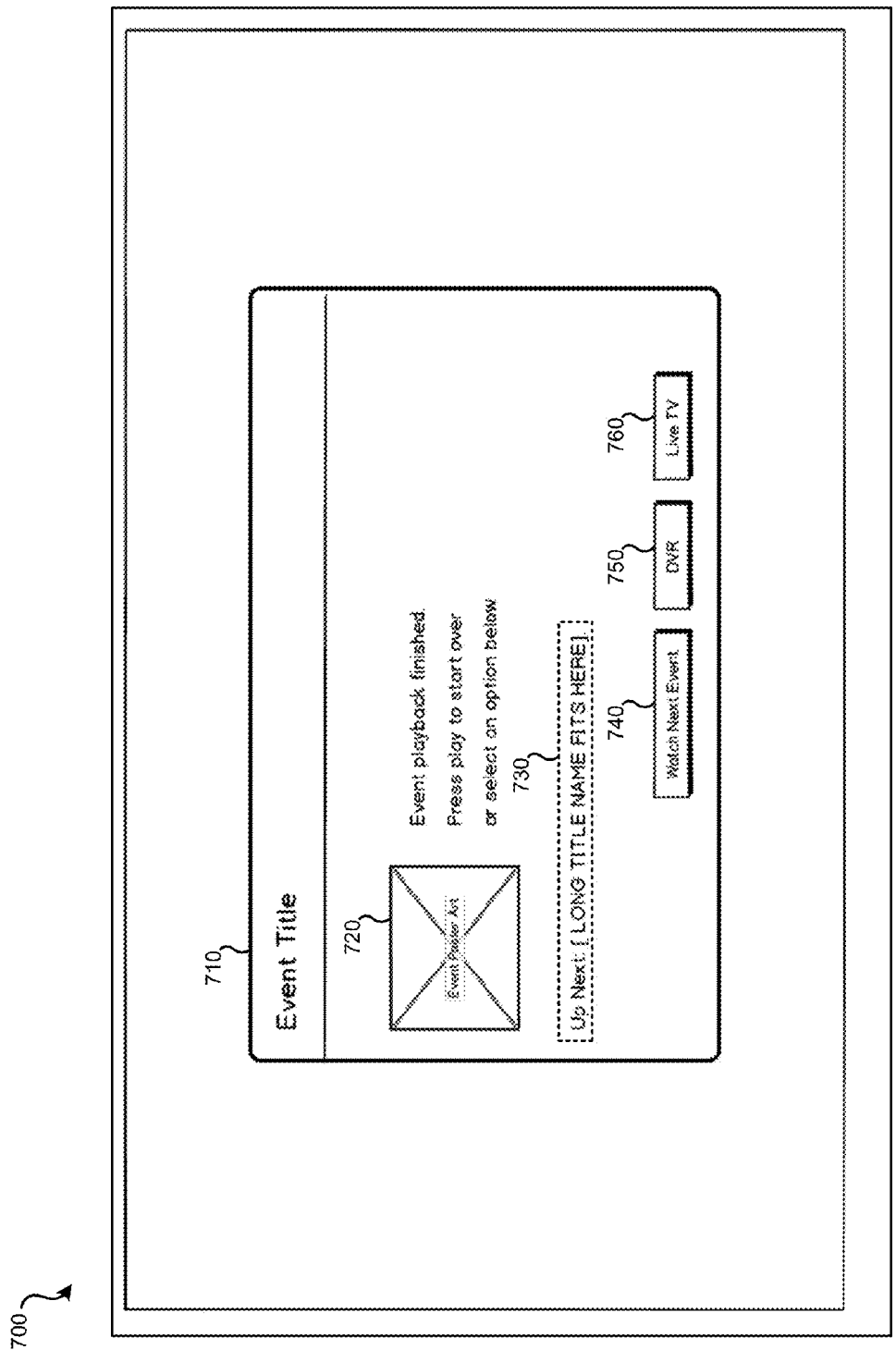
FIG. 7 illustrates an embodiment of a control for receiving user input following playback of a television program being completed.

Referring back to embodiment 300 of FIG. 3, playback indicator 340 indicates that playback of "Shark Land" (and the channel-specific file) has occurred for 27 minutes and 13 seconds. In a short time thereafter, "Shark Land" is scheduled to end and "True Friend" is scheduled to begin. In some embodiments, this next television program may automatically begin to play. In such embodiments, playback status element 320 may be temporarily displayed. In other embodiments, rather than the next television program beginning to play, user input may be requested in order to determine whether or not the next television program which was sequentially recorded as part of the channel-specific file should be played. FIG. 7 illustrates an embodiment 700 of a control for receiving user input following playback of a television program being completed. Embodiment 700 may be output by a television receiver, such as television receiver 200 of FIG. 2, based on data received via a television distribution system, such as satellite television distribution system 100 of FIG. 1. Embodiment 700 may be presented following playback of a television program or any of embodiments 300 through 600 being completed.

Event status 710 may be a pop-up displayed over video being output by the television receiver when a television program from a channel-specific file has completed being played back. In some embodiments, the next television program recorded as part of the channel-specific file may begin playing in the background on the display device. In other embodiments, playback of the channel-specific file may be paused or stopped until user input is received in the event status 710.

In the illustrated embodiment 700, showcard 720 of poster art for the television program that is completed being played back is displayed as part of event status 710. In some embodiments, a showcard for the next television program recorded as part of the channel-specific file may be presented additionally or instead. Upcoming program indicator 730 may indicate the next television program recorded as part of the channel-specific file.

Event status 710 may present a user with three options. A first option may be to watch the next television program that was recorded as part of the channel-specific file. For example, referring back to embodiment 300, if event status 710 is presented following the conclusion of "Shark Land," the user may select option 740 in order to begin playback of "True Friend." A second option may be to return to a DVR menu via select option 750. The DVR menu may allow the user to select a different channel and/or date in order to select other television programming for playback. In some embodiments, a return to the DVR menu may automatically occur if the user has selected a specific television program for playback rather than a channel-specific file for playback. As an example of this, referring to embodiment 300, if the user selected "CBC" Jul. 27, 2012 for playback, event status 710 may be presented upon conclusion of playback of the television program of the channel-specific file being completed. If the user had specifically selected "True Friend" for playback (e.g., via a DVR television program listing), event status 710 may not be presented, but rather the television receiver may return to a DVR menu. A third option may be for the user to provide input causing the television receiver to switch to live television via select option 760. This may result in the television receiver outputting television programming currently being received on a television channel. The television channel that is output for display by the television receiver may be the same television channel as last output live or may be the television channel that previously broadcast the television program which was recorded by the television receiver. For instance, referring to embodiment 300, upon conclusion of "True Friend" being played back, event status 710 being displayed, and a user selecting select option 760, the television channel "CBC" may be output live by the television receiver to a display device.

The television program names, television channel name, number of television programs, time period, and the specific arrangement of graphical elements of embodiment 700 are for example purposes only. It should be understood that the examples and details provided in relation to embodiment 700 may be applied to various implementations of similar presentation techniques that allow a user to interact with recorded television programs.

Figure 8:
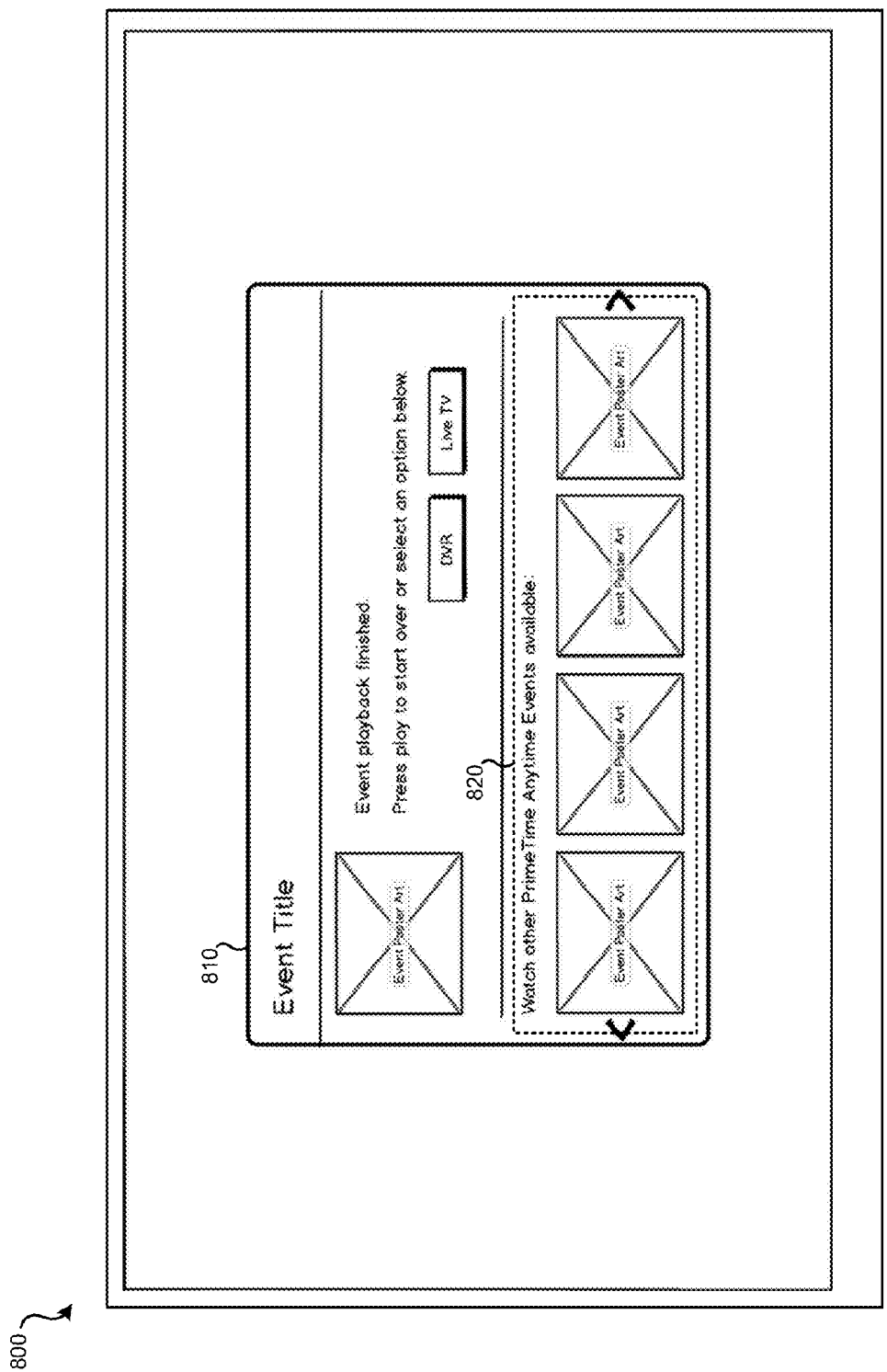
FIG. 8 illustrates another embodiment of a control for receiving user input following playback of a television program being completed.

FIG. 8 illustrates an embodiment 800 of a control for receiving user input following playback of a television program being completed. Embodiment 800 may represent an alternative embodiment of embodiment 700. As such, aspects of embodiment 800 may be incorporated into embodiment 700; similarly, aspects of embodiment 700 may be incorporated into embodiment 800. In embodiment 800, upon event status 810 being displayed (such as, following a television program of a channel-specific file completing playback), various other television programs that have been recorded as part of the same and/or other channel-specific files may be indicated. The indicated television programs may be similar in type (e.g., sitcom, drama) as the television program that has completed playback.

A television service provider may identify television programs in suggestion region 820 that fans of the television program that has completed playback may enjoy. Suggestion region 820 may use showcards for the suggested television programs. In some embodiments, rather than showing suggested television programs, television programs that were recorded over the same time period on other television channels may be indicated in suggestion region 820. For example, if the television program that completed playback was broadcast on Apr. 27, 2012 from 8-8:30 PM, television programs recorded from a broadcast of another television channel on Apr. 27, 2012 from 8-8:30 PM may be suggested to the user via suggestion region 820.

Figure 9:
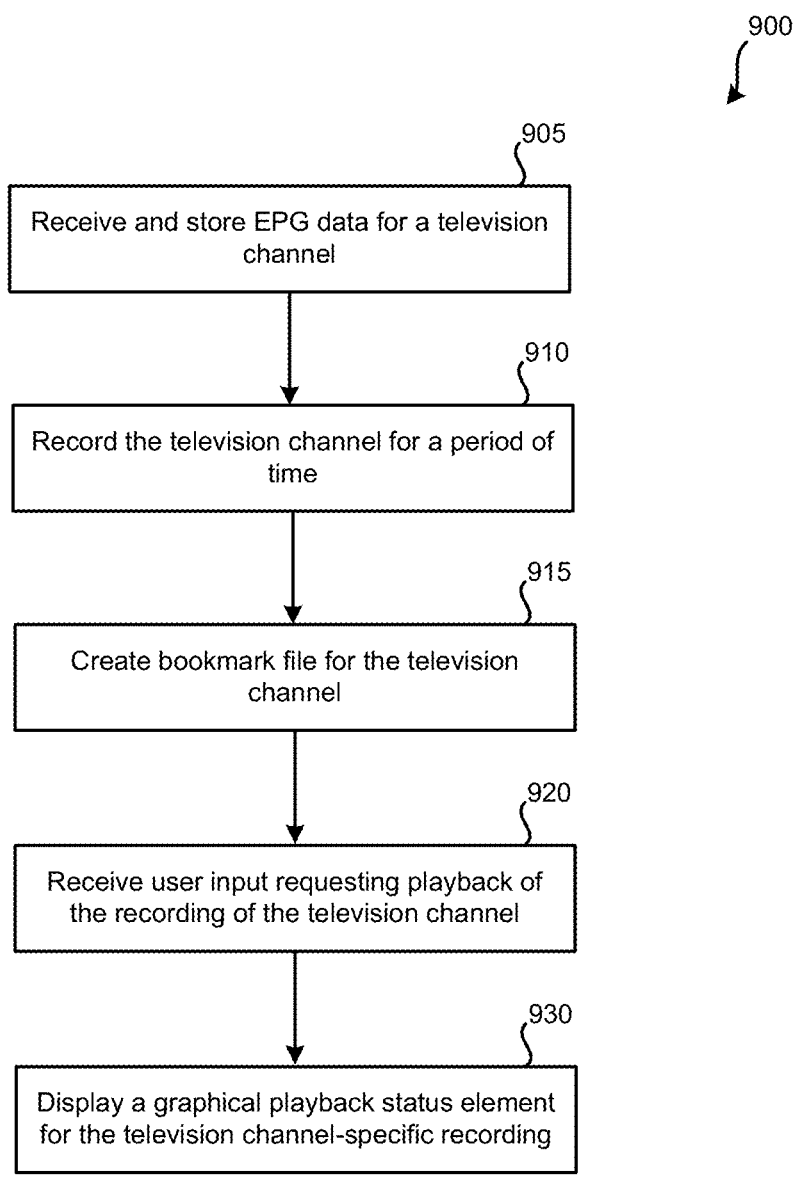
FIG. 9 illustrates an embodiment of a method for managing playback of stored television programs.

Using the previously-described television distribution systems and television receivers, various methods may be performed to manage playback of stored television programs. FIG. 9 illustrates an embodiment of a method 900 for managing playback of stored television programs. Each step of method 900 may be performed using the previously described devices, components, and systems. More specifically, each step of method 900 may be performed by a television receiver, such as television receiver 200 of FIG. 2. The system that performs method 900 may be computerized, having at least some components similar to computer system 1100 of FIG. 11. Means for performing each step of method 900 include one or more instances of all or a subset of the components presented in relation to television receiver 200 of FIG. 2 and/or computer system 1100 of FIG. 11.

At step 905, EPG data for a television channel may be received and stored by a television receiver. The EPG data may be transmitted to the television receiver via a television service provider's network. For instance, if satellite-based, television distribution system 100 of FIG. 1 may be used to provide EPG data to a television receiver. In other forms of television service provider networks, such as a cable-based television service provider network, distribution of EPG data may be via cable. The EPG data received by the television receiver may indicate: dates for television programs, channels for television programs, start times for television programs, end times for television programs, titles and descriptions for television programs, graphics for television programs (e.g., poster art to be used for showcards), and/or additional information related to television programs that are scheduled to be broadcast at some point in the future. EPG data may be received ahead of the broadcast of the television program. For example, EPG data for a day of television programming may be received approximately a week ahead of when the television programming will be broadcast.

At step 910, the television channel may be recorded for a period of time. This may result in a channel-specific file being created for the television channel. This channel-specific file may contain multiple television programs. For example, a television channel may be recorded over a period of time such as multiple hours. During this period of time, two or more television programs may be broadcast on the television channel. Further, multiple television channels may be recorded over the same period of time by the television receiver. These multiple television channels may be received using a single tuner of the television receiver. Further, these multiple television channels may be transmitted to the television receiver via a single transponder stream by a television service provider, thus allowing a single tuner to be used to receive the multiple television channels. The recording of the television channel at step 910 may be managed by the television service provider. The television service provider may configure the television receiver to record a particular television channel over a particular time period. As an example of this, a television service provider may configure television receivers of its subscribers to record television programming on each of the four major television networks (ABC, CBS, NBC, and FOX) from 7-10 PM nightly (using a single tuner of the subscriber's television receiver).

At step 915, a bookmark file may be created for the channel-specific file recorded at step 910. Creation of the bookmark file may occur as recording of the television channel at step 910 is performed. The bookmark file created at step 915 may contain some or all of the EPG data related to television programs recorded as part of the channel-specific file. Additional information may also be included in the bookmark file, such as an indication of where individual television programs are located within the channel-specific file. In some embodiments, a file offset may be used. For example, as a television channel-specific file is being recorded at step 910, when EPG data indicates that a next television program is scheduled to begin being broadcast, the file size of the channel-specific file may be determined. This measured file size may serve as an offset to indicate the point within the file at which the next television program is scheduled to begin. The offset may be stored to the bookmark file for each television program recorded within the channel-specific file.

At step 920, user input may be received requesting playback of the recording of the television channel. For instance, the user may specify a television channel and a date for which playback is requested. In some embodiments, the user may select a particular television program which was recorded as part of the channel-specific file for playback. As an example, referring to embodiment 300 of FIG. 3, a user may have selected television channel "CBC", the date Jul. 27, 2012, and/or the time range 7-10 PM for playback.

At step 930, a playback status element may be presented for the television channel-specific file recorded at step 910. Data used for displaying the playback status element at step 930 may at least be partially based on the bookmark file created at step 915. Embodiments 300, 400, 500, and 600 of FIGS. 3-6, respectively, are examples of various playback status elements which may be displayed at step 930. The playback status element displayed by the television receiver at step 930 via a display device may allow user input to be provided for selecting a different television channel-specific file associated with the same or different television channel and/or for selecting a different television program for playback. Other selections may also be made by a user, such as those described in relation to embodiment 300 through 600. The playback status element displayed at step 930 may be presented, for example, when playback is initially requested, when a new television program begins playback, and/or when a user has paused or stopped playback of the channel-specific file.

Figure 10:
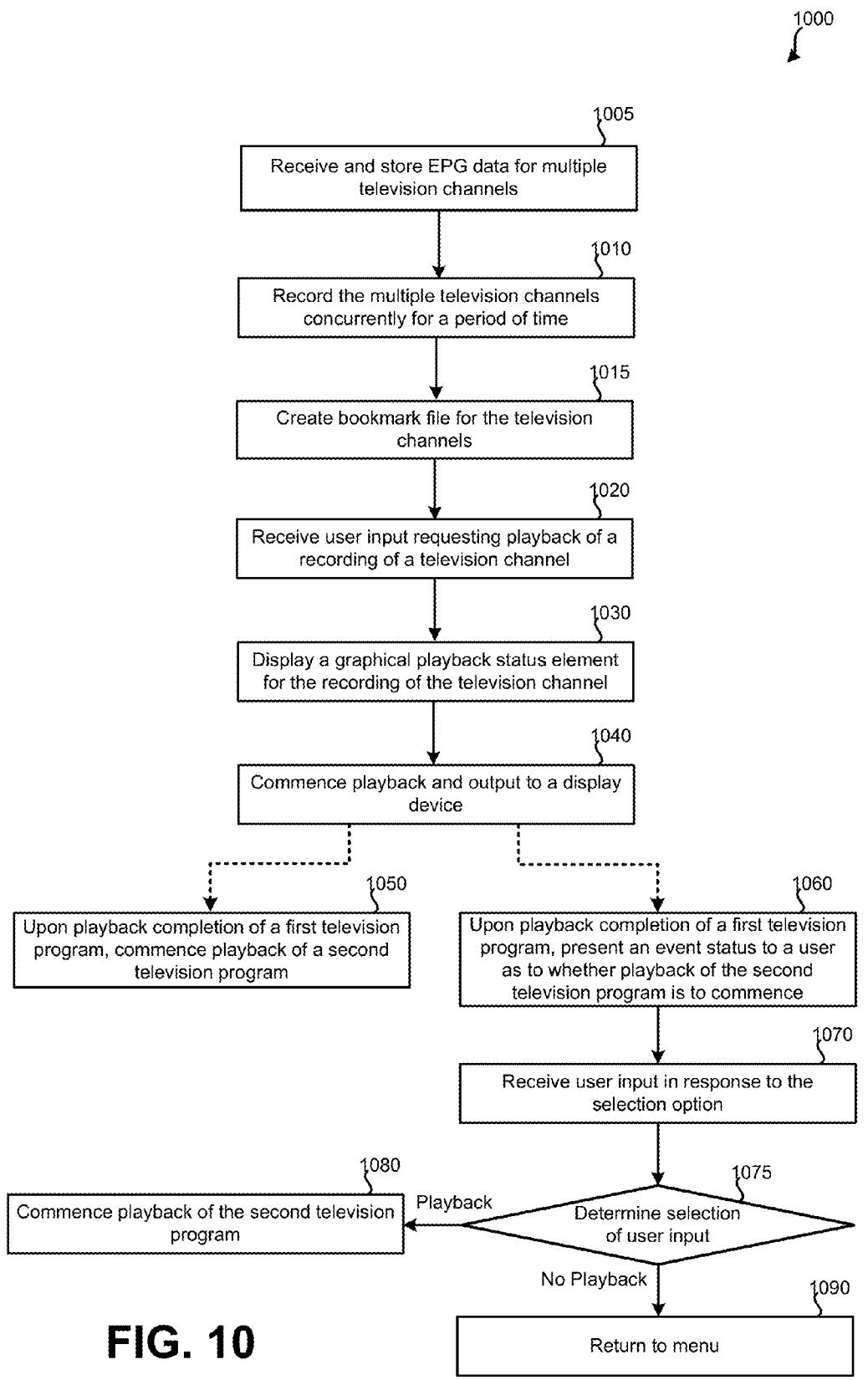
FIG. 10 illustrates an embodiment of a method for managing playback of stored television programs.

FIG. 10 illustrates an embodiment 1000 of a method for managing playback of stored television programs. Each step of method 1000 may be performed using the previously described components and systems. More specifically, each step of method 1000 may be performed by a television receiver, such as television receiver 200 of FIG. 2. The system that performs method 1000 may be computerized, having at least some components similar to computer system 1100 of FIG. 11. Means for performing each step of method 1000 include one or more instances of all or a subset of the components presented in relation to television receiver 200 of FIG. 2 and/or computer system 1100 of FIG. 11. Method 1000 may represent a more detailed or alternate embodiment of method 900 of FIG. 9.

At step 1005, EPG data for multiple television channels may be received and stored by a television receiver. The EPG data may be transmitted to the television receiver via a television service provider's network. For instance, if satellite-based, television distribution system 100 of FIG. 1 may be used to provide EPG data to a television receiver. In other forms of television service provider networks, such as a cable-based television service provider network, distribution of EPG data may be via cable. The EPG data received by the television receiver may indicate: dates for television programs, channels for television programs, start times for television programs, end times for television programs, titles and descriptions for television programs, graphics for television programs (e.g., poster art to be used for showcards), and/or additional information related to television programs that are scheduled to be broadcast at some point in the future. EPG data may be received ahead of the broadcast of the indicated television programs. For example, EPG data for a day of television programming may be received approximately a week ahead of when the television programming will be broadcast.

At step 1010, the multiple television channels may be recorded concurrently for a period of time. These television channels may be received using a single tuner of the television receiver. This may result in a channel-specific file being created for each of the television channels. The channel-specific files may each contain multiple television programs. For example, one of the television channels may be recorded over a period of time such as multiple hours. During this period of time, two or more television programs may be broadcast on the television channel. The multiple television channels may be transmitted to the television receiver via a single transponder stream by a television service provider, thus allowing the single tuner to be used to receive the multiple television channels. The recording of the television channel at step 1010 may be managed by the television service provider. The television service provider may configure the television receiver to record a particular television channel over a particular time period. As an example of this, a television service provider may configure television receivers of its subscribers to record television programming on each of the four major television networks (ABC, CBS, NBC, and FOX) from 7-10 PM nightly (using a single tuner of the subscriber's television receiver).

At step 1015, a bookmark file may be created for each channel-specific file recorded at step 1010. Creation of each bookmark file may occur as recording of the television channel at step 1010 is performed. The bookmark files created at step 1015 may contain some or all of the EPG data related to television programs recorded as part of the channel-specific files. Additional information may also be included in the bookmark files, such as an indication of where individual television programs are located within the channel-specific files. In some embodiments, a file offset may be used for such location identification. For example, as a television channel-specific file is being recorded at step 1010, when EPG data indicates that a time has been reached when the next television program is scheduled to begin being broadcast, the file size of the channel-specific file may be determined. This measured file size may serve as an offset to indicate the point within the file at which the next television program is scheduled to begin. The offset may be stored to the bookmark file for each television program recorded within the channel-specific file.

At step 1020, user input may be received requesting playback of one of the recordings of the television channels. For instance, the user may specify one of the television channels and a time/date for which playback is requested. In some embodiments, the user may select a particular television program which was recorded as part of the channel-specific file for playback. As an example, referring to embodiment 300 of FIG. 3, a user may have selected television channel "CBC", the date Jul. 27, 2012, and/or the time range 7-10 PM for playback.

At step 1030, a playback status element may be presented for one or more of the television channel-specific files recorded at step 1010. In some embodiments the playback status element may only indicate the television channel currently selected for playback (such as embodiment 300 of FIG. 3). In other embodiments the playback status element may indicate multiple television channels (possibly that were recorded at the same time) that are available for playback (such as embodiment 500 of FIG. 5). Data used for displaying the playback status element at step 1030 may at least be partially based on the bookmark file created at step 1015. Embodiments 300, 400, 500, and 600 of FIGS. 3-6, respectively, are examples of various playback status elements which may be displayed at step 1030. The playback status element displayed by the television receiver at step 1030 via a display device may allow user input to be provided for selecting a different television channel-specific file associated with the same or different television channel and/or for selecting a different television program for playback. Other selections may also be made by a user, such as those described in relation to embodiment 300 through 600. The playback status element displayed at step 1030 may be presented, for example, when playback is initially requested, when a new television program begins playback, and/or when a user has paused or stopped playback of the channel-specific file.

At step 1040, playback of the selected television channel and/or selected television program may be played back from one of the television channel-specific files recorded at step 1010. When a television program that is part of the channel-specific file being played back has completed according to the corresponding bookmark file created at step 1015, method 1000 may proceed to step 1050 or step 1060, depending on the embodiment. At step 1050, when the television program has completed playback, the next television program within the same channel-specific file may commence playback. The playback status element may be displayed for a predefined period of time when such playback begins. The next television program may correspond to the television program that was broadcast (and thus recorded) immediately following the television program that was played back at step 1040. Embodiments of method 1000 may proceed to step 1050 when a channel-specific file is selected for playback rather than a specific television program from within the channel-specific file being selected for playback.

In some embodiments, method 1000 may proceed to step 1060 from step 1040. At step 1060, when playback of the first television program played back at step 1040 is complete, an event status may be presented to the user. For example, an event status such as in embodiments 700 and 800 of FIGS. 7 and 8, respectively, may be presented. Such event statuses may allow a user to provide input as to whether the next television program recorded as part of the channel-specific file is to be played back, to return to a DVR menu, switch to live television broadcasts, or some other option.

At step 1070, user input indicating the selected option may be received. Such input may be received from a remote control or some other form of input device by the television receiver. At step 1075, the user input is analyzed to determine if, for example, the user has indicated that the next television program recorded as part of the channel-specific file is to be played back. If the first television program played back at step 1040 was the last recorded television program within the channel-specific file, the option of continued playback may not be available to the user (or the option may switch to a channel-specific file for the same channel from a different date or a channel-specific file for a different channel). If the user selects continued playback of the channel-specific file, at step 1080 the second television program may be played back. This second television program may have been recorded as part of the channel-specific file at step 1010 on the same television channel as the first channel when the first television program was completed being broadcast.

At step 1075, if a user indicates that playback of the next recorded television program within the channel-specific file is not to occur, method 1000 may proceed to step 1090. At step 1090, some other action may be performed, such as returning to a DVR menu.

Figure 11:
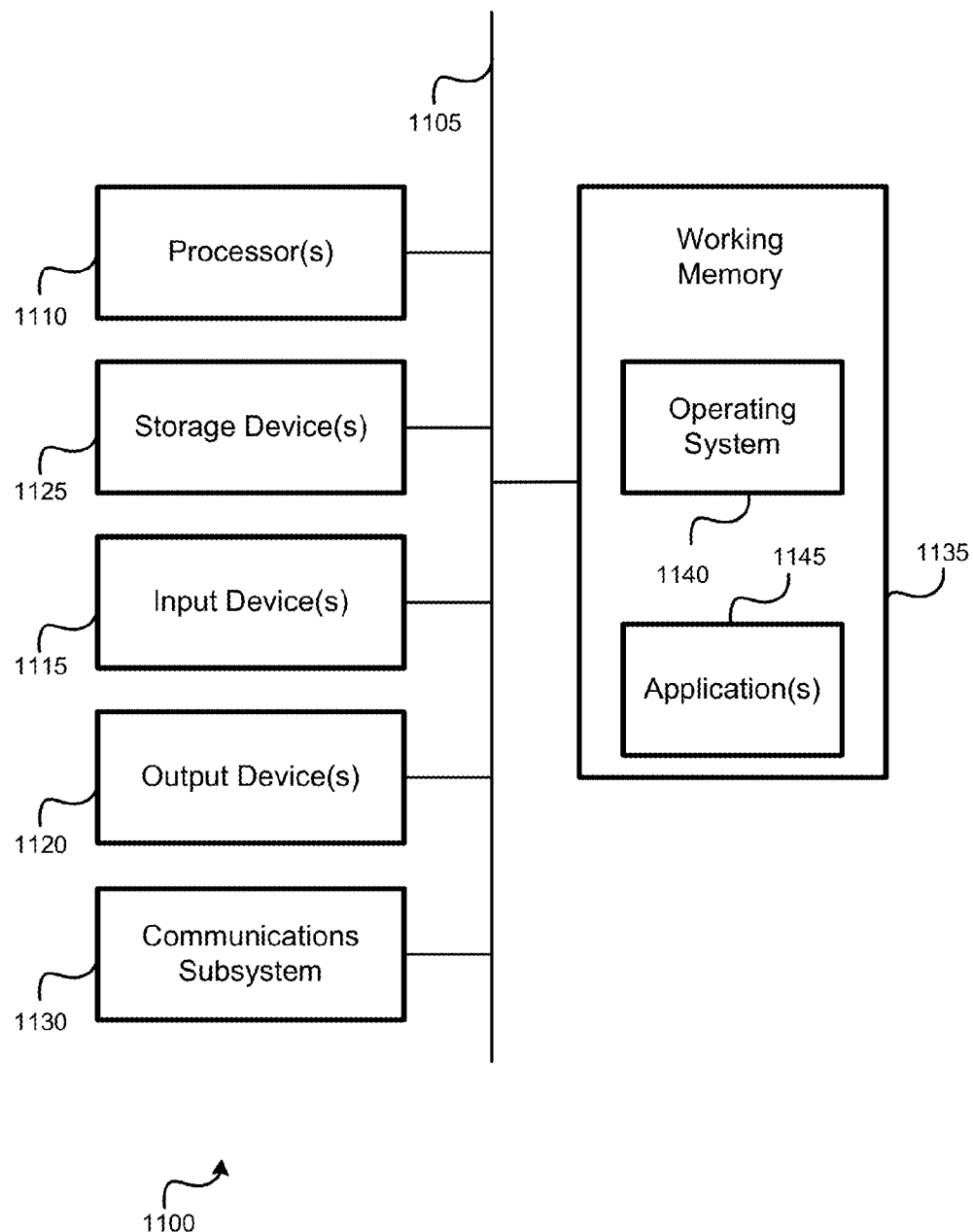
FIG. 11 illustrates an embodiment of a computer system.

A computer system as illustrated in FIG. 11 may be incorporated as part of the previously described computerized devices. For example, computer system 1100 can represent some of the components of the television receivers and/or television service provider system. FIG. 11 provides a schematic illustration of an embodiment of a computer system 1100 that can perform the methods detailed herein. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105 (or may otherwise be in communication, as appropriate). The hardware elements may include one or more processors 1110, including without limitation one or more general-purpose processors and/or one or more special-purpose processors (such as digital signal processing chips, graphics acceleration processors, and/or the like); one or more input devices 1115, which can include without limitation a mouse, a keyboard, and/or the like; and one or more output devices 1120, which can include without limitation a display device, a printer, and/or the like.

The computer system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1100 might also include a communications subsystem 1130, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 1130 may permit data to be exchanged with a network (such as the network described below, to name one example), other computer systems, and/or any other devices described herein. In many embodiments, the computer system 1100 will further comprise a working memory 1135, which can include a RAM or ROM device, as described above.

The computer system 1100 also can comprise software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1125 described above. In some cases, the storage medium might be incorporated within a computer system, such as computer system 1100. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1100) to perform methods in accordance with various embodiments of the invention. According to a set of embodiments, some or all of the procedures of such methods are performed by the computer system 1100 in response to processor 1110 executing one or more sequences of one or more instructions (which might be incorporated into the operating system 1140 and/or other code, such as an application program 1145) contained in the working memory 1135. Such instructions may be read into the working memory 1135 from another computer-readable medium, such as one or more of the non-transitory storage device(s) 1125. Merely by way of example, execution of the sequences of instructions contained in the working memory 1135 might cause the processor(s) 1110 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1100, various computer-readable media might be involved in providing instructions/code to processor(s) 1110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1125. Volatile media include, without limitation, dynamic memory, such as the working memory 1135.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100.

The communications subsystem 1130 (and/or components thereof) generally will receive signals, and the bus 1105 then might carry the signals (and/or the data, instructions, etc. carried by the signals) to the working memory 1135, from which the processor(s) 1110 retrieves and executes the instructions. The instructions received by the working memory 1135 may optionally be stored on a non-transitory storage device 1125 either before or after execution by the processor(s) 1110.

It should further be understood that the components of computer system 1100 can be distributed across a network. For example, some processing may be performed in one location using a first processor while other processing may be performed by another processor remote from the first processor. Other components of computer system 1100 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A system for managing playback of stored television programs, the system comprising:
   one or more processors; and
   a memory communicatively coupled with and readable by the one or more processors and having stored therein processor-readable instructions which, when executed by the one or more processors, cause the one or more processors to:
      cause a plurality of recordings of television channels to be recorded, wherein each recording of the plurality of recordings of the television channels comprises a plurality of television programs;
      cause a plurality of channel-specific identifiers to be presented via a display device such that the plurality of channel-specific identifiers are presented simultaneously, wherein each channel-specific identifier of the plurality of channel-specific identifiers represents the television channel from which one of the plurality of recordings was recorded;
      simultaneously with presentation of the plurality of channel-specific identifiers, cause a graphical playback status element for a recording of a television channel from the plurality of recordings of television channels to be presented aligned with a channel-specific identifier of the plurality of channel-specific identifiers, the graphical playback status element comprising:
         a start point for a television program of the plurality of television programs within the recording of the television channel, wherein:
            the channel-specific identifier represents the television channel from which the recording of the television channel was recorded.

2. The system for managing playback of stored television programs of claim 1, wherein the start point for the television program of the plurality of television programs is denoted by a graphical showcard that presents graphical poster art indicative of the television program.

3. The system for managing playback of stored television programs of claim 1, wherein the processor-readable instructions which, when executed by the one or more processors, further cause the one or more processors to:
   receive user input selecting a second channel-specific identifier of the plurality of channel-specific identifiers being presented simultaneously via the display device.

4. The system for managing playback of stored television programs of claim 3, wherein the processor-readable instructions which, when executed by the one or more processors, further cause the one or more processors to:
   simultaneously with presentation of the plurality of channel-specific identifiers, cause a second graphical playback status element to be presented aligned with the second channel-specific identifier of the plurality of channel-specific identifiers, the second graphical playback status element comprising:
      a second start point for a second television program of a second plurality of television programs within a second recording of a second television channel of the plurality of television channels.

5. The system for managing playback of stored television programs of claim 4, wherein the processor-readable instructions which, when executed by the one or more processors, further cause the one or more processors to:
   cease presenting the graphical playback status element in response to the user input selecting the second channel-specific identifier.

6. The system for managing playback of stored television programs of claim 1, wherein the processor-readable instructions which, when executed by the one or more processors, cause the graphical playback status element to be presented aligned with the channel-specific identifier of the plurality of channel-specific identifiers further comprises processor-readable instructions which, when executed by the one or more processors, cause the graphical playback status element to be presented horizontally aligned with the channel-specific identifier.

7. The system for managing playback of stored television programs of claim 6, wherein the processor-readable instructions which, when executed by the one or more processors, cause the plurality of channel-specific identifiers to be presented via the display device such that the plurality of channel-specific identifiers are presented simultaneously further comprises processor-readable instructions which, when executed by the one or more processors, cause the plurality of channel-specific identifiers to be presented vertically aligned with each other.

8. A method for managing playback of stored television programs, the method comprising:
   recording, by a television receiver, a plurality of recordings of television channels, wherein each recording of the plurality of recordings of the television channels comprises a plurality of television programs;
   outputting, by the television receiver, a plurality of channel-specific identifiers to be presented via a display device such that the plurality of channel-specific identifiers are presented simultaneously, wherein each channel-specific identifier of the plurality of channel-specific identifiers represents the television channel from which one of the plurality of recordings was recorded;
   simultaneously with presentation of the plurality of channel-specific identifiers, outputting, by the television receiver, a graphical playback status element for a recording of a television channel from the plurality of recordings of television channels to be presented aligned with a channel-specific identifier of the plurality of channel-specific identifiers, the graphical playback status element comprising:
- a start point for a television program of the plurality of television programs within the recording of the television channel, wherein:
  - the channel-specific identifier represents the television channel from which the recording of the television channel was recorded.

9. The method for managing playback of stored television programs of claim 8, wherein the start point for the television program of the plurality of television programs is denoted by a graphical showcard that presents graphical poster art indicative of the television program.

10. The method for managing playback of stored television programs of claim 8, wherein the method further comprising:
- receiving, by the television receiver, user input selecting a second channel-specific identifier of the plurality of channel-specific identifiers being presented simultaneously via the display device.

11. The method for managing playback of stored television programs of claim 10, the method further comprising:
- simultaneously with presentation of the plurality of channel-specific identifiers, outputting, by the television receiver, a second graphical playback status element to be presented aligned with the second channel-specific identifier of the plurality of channel-specific identifiers, the second graphical playback status element comprising:
  - a second start point for a second television program of a second plurality of television programs within a second recording of a second television channel of the plurality of television channels.

12. The method for managing playback of stored television programs of claim 11, the method further comprising:
- ceasing, by the television receiver, to output for presentation the graphical playback status element in response to the user input selecting the second channel-specific identifier.

13. The method for managing playback of stored television programs of claim 8, wherein outputting the graphical playback status element to be presented aligned with the channel-specific identifier of the plurality of channel-specific identifiers further comprises outputting the graphical playback status element for presentation in horizontal alignment with the channel-specific identifier.

14. The method for managing playback of stored television programs of claim 13, wherein outputting the plurality of channel-specific identifiers to be presented via the display device such that the plurality of channel-specific identifiers are presented simultaneously further comprises outputting the plurality of channel-specific identifiers for presentation vertically aligned with each other.

15. A non-transitory processor-readable medium for managing playback of stored television programs comprising processor-readable instructions configured to cause one or more processors to:
- cause a plurality of recordings of television channels to be recorded, wherein each recording of the plurality of recordings of the television channels comprises a plurality of television programs;
- cause a plurality of channel-specific identifiers to be presented via a display device such that the plurality of channel-specific identifiers are presented simultaneously, wherein each channel-specific identifier of the plurality of channel-specific identifiers represents the television channel from which one of the plurality of recordings was recorded;
- simultaneously with presentation of the plurality of channel-specific identifiers, cause a graphical playback status element for a recording of a television channel from the plurality of recordings of television channels to be presented aligned with a channel-specific identifier of the plurality of channel-specific identifiers, the graphical playback status element comprising:
  - a start point for a television program of the plurality of television programs within the recording of the television channel, wherein:
    - the channel-specific identifier represents the television channel from which the recording of the television channel was recorded.

16. The non-transitory processor-readable medium for managing playback of stored television programs of claim 15, wherein the start point for the television program of the plurality of television programs is denoted by a graphical showcard that presents graphical poster art indicative of the television program.

17. The non-transitory processor-readable medium for managing playback of stored television programs of claim 15, wherein the processor-readable instructions are further configured to cause the one or more processors to:
- receive user input selecting a second channel-specific identifier of the plurality of channel-specific identifiers being presented simultaneously via the display device.

18. The non-transitory processor-readable medium for managing playback of stored television programs of claim 17, wherein the processor-readable instructions are further configured to cause the one or more processors to:
- simultaneously with presentation of the plurality of channel-specific identifiers, cause a second graphical playback status element to be presented aligned with the second channel-specific identifier of the plurality of channel-specific identifiers, the second graphical playback status element comprising:
  - a second start point for a second television program of a second plurality of television programs within a second recording of a second television channel of the plurality of television channels.

19. The non-transitory processor-readable medium for managing playback of stored television programs of claim 18, wherein the processor-readable instructions which, when executed by the one or more processors, further cause the one or more processors to:
- cease presenting the graphical playback status element in response to the user input selecting the second channel-specific identifier.

20. The non-transitory processor-readable medium for managing playback of stored television programs of claim 15, wherein the processor-readable instructions configured to cause the one or more processors to cause the graphical playback status element to be presented aligned with the channel-specific identifier of the plurality of channel-specific identifiers comprise processor-readable instructions configured to cause the one or more processors to cause the graphical playback status element to be presented horizontally aligned with the channel-specific identifier and cause the plurality of channel-specific identifiers to be presented vertically aligned with each other.

* * * * *